(12) United States Patent
Okuda

(10) Patent No.: US 7,559,684 B2
(45) Date of Patent: Jul. 14, 2009

(54) ELECTRO-OPTICAL DEVICE, ILLUMINATION DEVICE, ELECTRONIC APPARATUS, AND PRODUCTION METHOD OF ELECTRO-OPTICAL DEVICE

(75) Inventor: Tatsumi Okuda, Motosu (JP)

(73) Assignee: Epson Imaging Devices Corporation (JP)

( * ) Notice: Subject to any disclaimer, the term of this patent is extended or adjusted under 35 U.S.C. 154(b) by 0 days.

(21) Appl. No.: 11/856,295

(22) Filed: Sep. 17, 2007

(65) Prior Publication Data

US 2008/0112189 A1 May 15, 2008

(30) Foreign Application Priority Data

Nov. 13, 2006 (JP) ............................. 2006-306247

(51) Int. Cl.
*F21V 7/04* (2006.01)
(52) U.S. Cl. .................... 362/631; 362/610; 362/633
(58) Field of Classification Search ............. 362/608, 362/610, 612, 613, 615, 628, 631, 632, 633, 362/634; 349/58, 65
See application file for complete search history.

(56) References Cited

U.S. PATENT DOCUMENTS 7,083,317 B2 * 8/2006 Higashiyama .............. 362/634

2007/0258264 A1* 11/2007 Hong ........................ 362/613
2008/0101084 A1* 5/2008 Hsu ......................... 362/612

FOREIGN PATENT DOCUMENTS

| EP | 1860372 | | 11/2007 |
|----|---------|---|---------|
| JP | 2004006081 A | * | 1/2004 |
| JP | 2005-017613 | | 1/2005 |
| JP | 2005-173302 | | 6/2005 |
| WO | WO2006-87863 | | 8/2006 |

* cited by examiner

Primary Examiner—Y My Quach Lee
(74) Attorney, Agent, or Firm—Harness, Dickey & Pierce, P.L.C.

(57) ABSTRACT

The invention provides an electro-optical device that includes: an electro-optical panel; light sources that emit light that enters the electro-optical panel; an optical waveguide board that guides the light emitted from the light sources toward the electro-optical panel; and a flexible printed circuit board on which the light sources are mounted, wherein the flexible printed circuit board is adhered to the optical waveguide board by adhesive members in such a manner that a part of the flexible printed circuit board is opposed to a surface of the optical waveguide board and that the light sources are positioned to be opposed to an edge face of the optical waveguide board, and concave portions are formed in the optical waveguide board at least at positions where the adhesive members are provided.

8 Claims, 15 Drawing Sheets

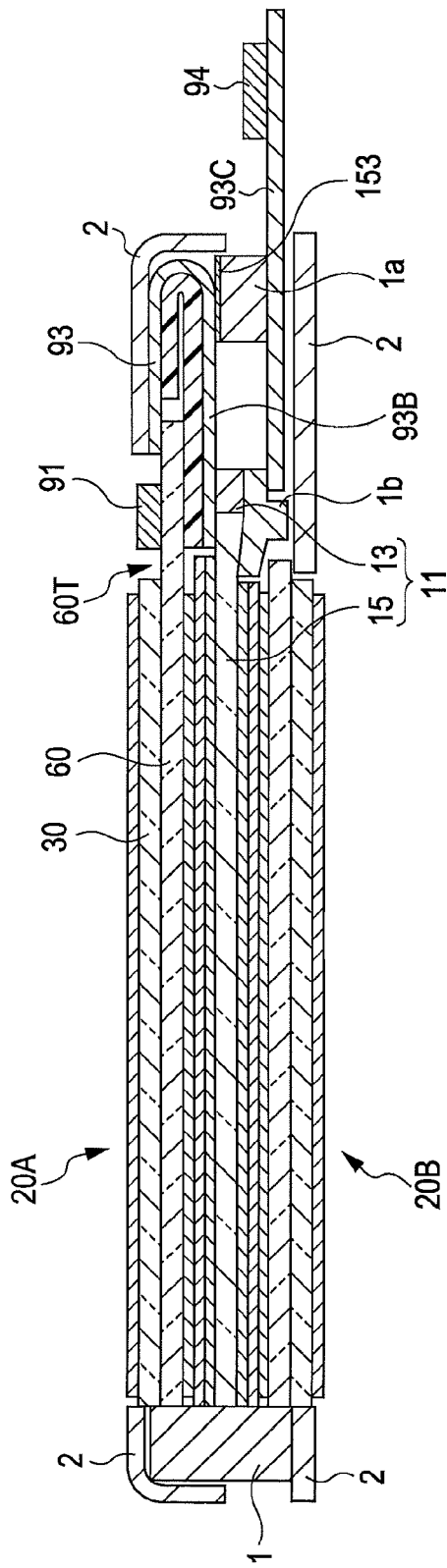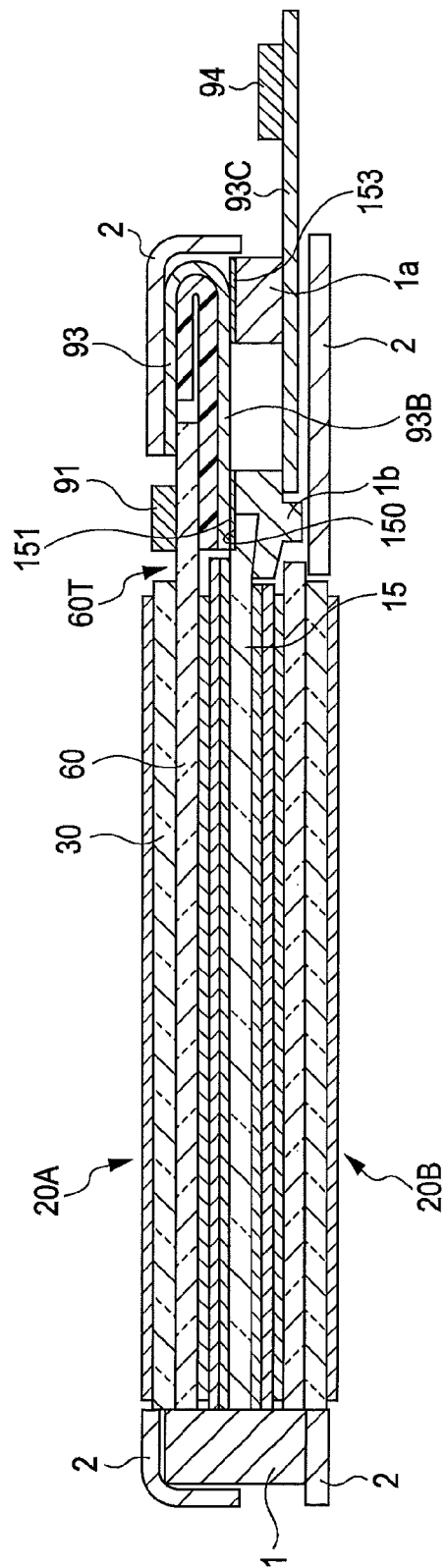

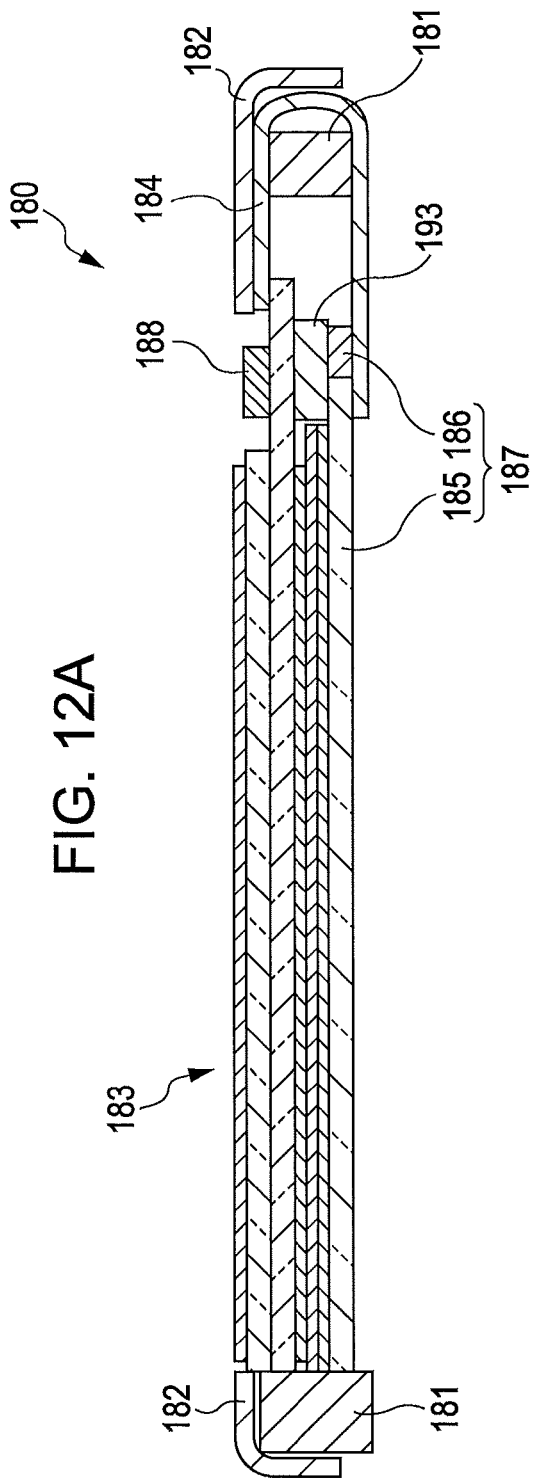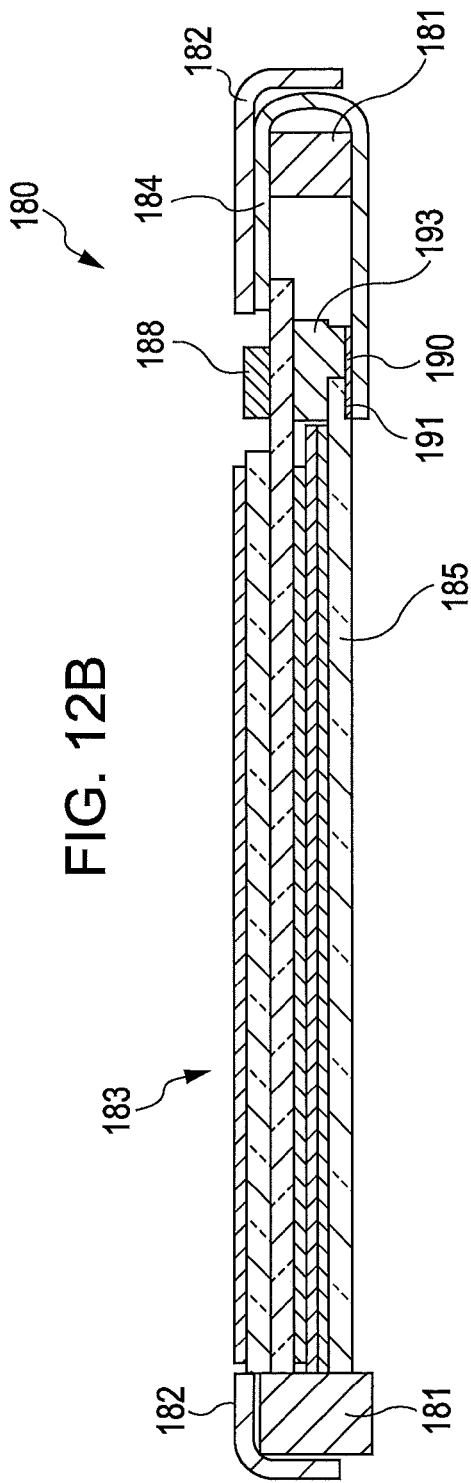

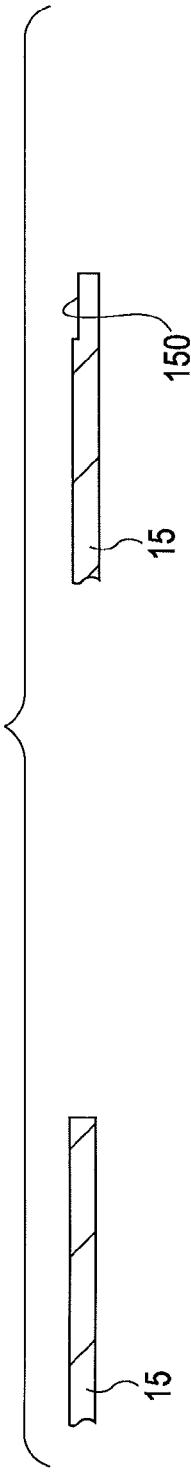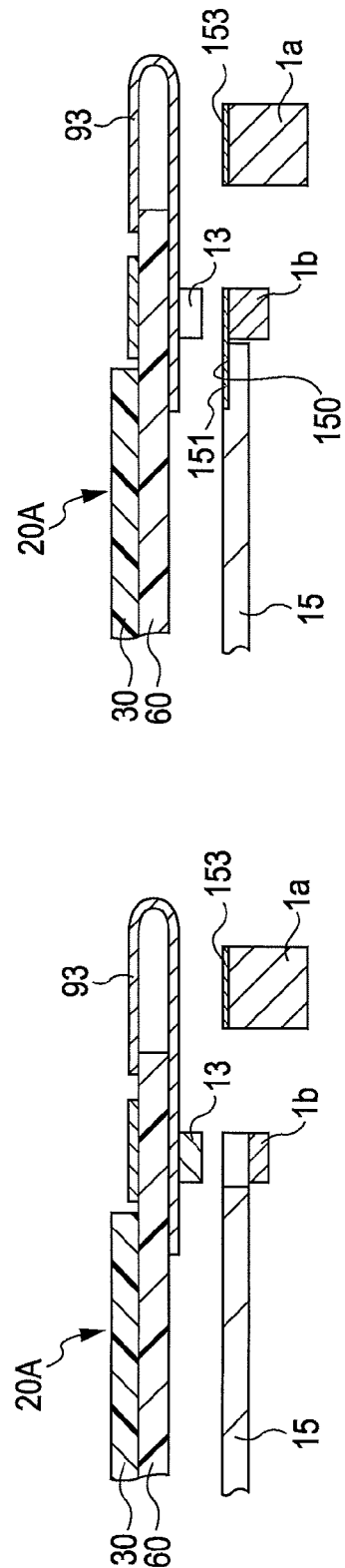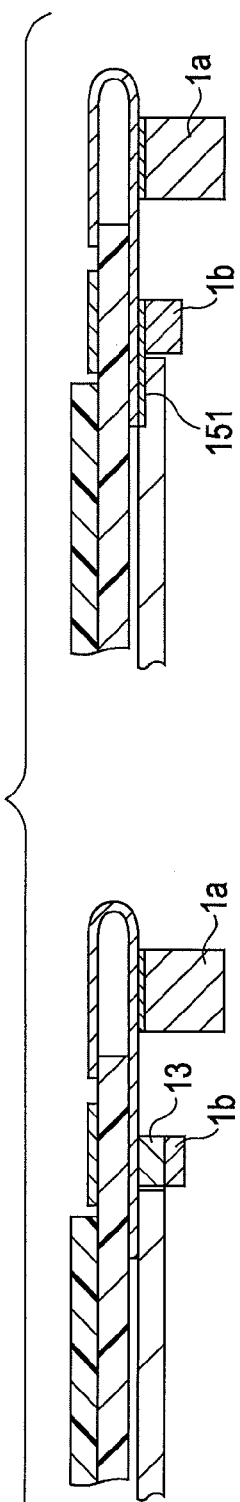

ELECTRO-OPTICAL DEVICE, ILLUMINATION DEVICE, ELECTRONIC APPARATUS, AND PRODUCTION METHOD OF ELECTRO-OPTICAL DEVICE

The entire disclosure of Japanese Patent Application No. 2006-306247, filed Nov. 13, 2006 is expressly incorporated by reference herein.

BACKGROUND

1. Technical Field

The present invention generally relates to an electro-optical device, an illumination device, an electronic apparatus, and a method for production of the electro-optical device. More particularly, the invention relates to an electro-optical device, an illumination device, an electronic apparatus, and a method for production of the electro-optical device, which is provided with a flexible printed circuit board on which light sources are mounted.

2. Related Art

A known example of electro-optical devices for displaying images is a liquid crystal device. A liquid crystal device modulates light that passes through a liquid crystal material provided at a plurality of pixels thereof so as to display images such as pictures and characters. Having an opposing pair of substrates that have respective electrodes formed thereon, such a liquid crystal display device performs light modulation to display images by turning voltages applied to the plurality of pixels thereof ON/OFF in a selective manner, where the intersection areas of the respective electrodes are defined as the plurality of pixels.

In such a liquid crystal device, an illumination device is used as means for performing transmissive-mode display. In order to realize a flat and compact body of the liquid crystal device, the illumination device has a configuration in which light sources such as LEDs are mounted at the edge of an optical waveguide board on a flexible printed circuit board (FPC) so as to guide light that is emitted from the light source toward a liquid crystal panel.

In the illumination device having such a configuration, in order to guide light coming from the light source toward the liquid crystal panel with a satisfactory light-guiding performance, it is necessary to ensure that the optical axis of the light source is never shifted with respect to the optical waveguide board so that the light emitted from the light source enters efficiently into the optical waveguide board.

For the purpose of meeting the above optical requirements, JP-A-2005-17613 (in particular, refer to the scope of claims and FIG. 1 thereof) proposes an electro-optical device having a configuration in which an optical waveguide board and light sources are fixed so that the optical axis of the light source is never shifted with respect to the optical waveguide board so that an ample amount of light enters the optical waveguide board, which is provided for guiding light from the light source to the liquid crystal panel. More specifically, as illustrated in FIG. 16, the above-identified patent document discloses an electro-optical device 300 that includes an electro-optical panel, an optical waveguide board 303, a guide unit 305 that supports the electro-optical panel and the optical waveguide board 303, and a flexible printed circuit board 309 on which light sources 307 are mounted. According to the electro-optical device 300 described in the above-identified patent document, a double-faced adhesive tape 310 that sticks the flexible printed circuit board 309 and the optical waveguide board 303 together is adhered on the optical waveguide board 303. The double-faced adhesive tape 310, which is formed roughly in the shape of letter "U", or in other words, the shape of one half of square brackets, and is made up of one first line portion 311 and two second line portions 312 which are perpendicular to the first line portion 311, is adhered thereon in such a manner that it surrounds light input portions 3031 of the optical waveguide board 303.

According to the electro-optical device 300 described in the above-identified patent document, JP-A-2005-17613, the flexible printed circuit board 309 does not contact the optical waveguide board 303 directly due to the presence of the adhesive member (i.e., adhesive tape) 310. For this reason, light that was emitted from the light source 307 occasionally leaks out through a gap where the adhesive member 310 is not present, which could result in lower light utilization efficiency and/or unstable brightness. In addition to the above disadvantages, as illustrated in FIG. 17, the entire thickness of the electro-optical device 300 as a whole is increased by a thickness of the adhesive member 310, which is denoted as T. Moreover, the optical axis S of light emitted from the light source 307 is shifted disadvantageously.

As a conventional solution to overcome the above disadvantages, FIG. 18 illustrates an alternative fixing method according to which the flexible printed circuit board 309 is fixed only to a chassis (i.e., casing) 153 by an adhesive member 353, meaning that the flexible printed circuit board 309 is not fixed to the optical waveguide board 303 at all. Disadvantageously, according to such an alternative fixing method, however, the positional relationship between the light sources 307 and the optical waveguide board 303 is not maintained as these get shifted with respect to each other because the flexible printed circuit board 309 is not fixed to the optical waveguide board 303, which makes it impossible to obtain stable brightness.

SUMMARY

The inventors of the present invention have made committed efforts to discover that the above disadvantages could be overcome by, firstly, fixing the optical waveguide board and the flexible printed circuit board to each other by adhesive members and by, secondly, forming concave portions in the optical waveguide board in such a manner that each of the concave portions is provided at a position where a corresponding one of the adhesive members is placed, thereby arriving at the idea of the present invention.

An advantage of some aspects of the invention is to provide an electro-optical device featuring a flat body that is capable of effectively preventing optical leakage and obtaining stable brightness, which is achieved by fixing the optical waveguide board and the flexible printed circuit board to each other with, theoretically, no gap existing between the optical waveguide board and the flexible printed circuit board. Another advantage of some aspects of the invention is to provide an illumination device used for such an electro-optical device, an electronic apparatus that is provided with such an electro-optical device, and a production method for efficiently manufacturing such an electro-optical device.

The invention provides an electro-optical device that includes: an electro-optical panel; a light source that emits light that enters the electro-optical panel; an optical waveguide board that guides the light emitted from the light source toward the electro-optical panel; and a flexible printed circuit board on which the light source is mounted, wherein the flexible printed circuit board is adhered to the optical waveguide board by an adhesive member in such a manner that a part of the flexible printed circuit board is opposed to a surface of the optical waveguide board and that the light source is positioned to be opposed to an edge face of the optical waveguide board, and a concave portion is formed in the optical waveguide board at least at a position where the adhesive member is provided. Therefore, the invention provides a solution to the problems described above.

That is, since the concave portions are provided at positions corresponding to those of the adhesive members, which adhere the flexible printed circuit board to the optical waveguide board, it is possible to reduce a gap between the flexible printed circuit board and the optical waveguide board at regions thereof where the adhesive members are not provided. Therefore, the invention provides a flat electro-optical device which features reduced optical leakage and stable brightness.

In the configuration of an electro-optical device according to the present invention, it is preferable that the depth of the concave portion is equal to the thickness of the adhesive member in a state where the optical waveguide board and the flexible printed circuit board are adhered to each other.

With such a configuration, because it is possible to make the surface of the positions where the adhesive members are provided level with the surface of other positions where the adhesive members are not provided, it is possible to ensure that, theoretically, no gap exists between the optical waveguide board and the flexible printed circuit board, thereby reducing optical leakage. In addition thereto, it is possible to reduce the total thickness of the electro-optical device by the thickness of the adhesive members.

In the configuration of an electro-optical device according to the present invention, it is preferable that the concave portion is interposed between an adjacent pair of the plurality of light sources.

With such a configuration, it is possible to effectively prevent the amount of light that has been emitted from the light sources to be reduced due to the presence of the concave portions and the adhesive members. In addition thereto, it is further possible to effectively reduce an interference fringe/pattern appearing in the display region, which could occur if any adhesive member exists on an optical path from the light source.

In the configuration of an electro-optical device according to the present invention, it is preferable that the optical waveguide board has a protruding portion that is interposed between an adjacent pair of the plurality of light sources, and the concave portion is formed in the protruding portion.

With such a configuration, large adhesion areas for secure fixation of the optical waveguide board and the flexible printed circuit board are ensured. Thus, it is possible to support the light sources stably, thereby preventing the occurrence of shift in the optical axis of the light source with respect to the optical waveguide board with a greater reliability.

In the configuration of an electro-optical device according to the present invention, it is preferable that the electro-optical panel and the optical waveguide board are housed in a chassis, the flexible printed circuit board is further adhered to the chassis by an adhesive member, and the same adhesive member is used to adhere the flexible printed circuit board both to the chassis and to the optical waveguide board.

With such a configuration, the pasting of the adhesive member is completed in a single production step, which results in improved production efficiency. In addition, stable brightness is ensured because the positional relationship between the flexible printed circuit board, the chassis, and the optical waveguide board is maintained without any shift therebetween.

As another aspect of the invention, the invention provides an illumination device that includes: a light source that emits light; an optical waveguide board that guides the light emitted from the light source toward an electro-optical panel; and a flexible printed circuit board on which the light source is mounted, wherein the flexible printed circuit board is adhered to a light-emitting surface of the optical waveguide board by an adhesive member in such a manner that a part of the flexible printed circuit board is opposed to a surface of the optical waveguide board and that the light source is positioned to be opposed to an edge face of the optical waveguide board, and a concave portion is formed in the light-emitting surface of the optical waveguide board corresponding to a position where the adhesive member is provided.

That is, since the concave portions are provided at positions corresponding to those of the adhesive members, which adhere the flexible printed circuit board to the optical waveguide board, it is possible to reduce a gap between the flexible printed circuit board and the optical waveguide board at regions thereof where the adhesive members are not provided. Therefore, the invention provides an illumination device which features reduced optical leakage and stable brightness. In addition thereto, with such a configuration, it is possible to reduce the total thickness of the illumination device by the thickness of the adhesive members.

As still another aspect of the invention, the invention provides a method of producing an electro-optical device that includes an electro-optical panel, a light source that emits light that enters the electro-optical panel, an optical waveguide board that guides the light emitted from the light source toward the electro-optical panel, and a flexible printed circuit board on which the light source is mounted, where the electro-optical device production method includes the steps of: providing an adhesive member in a concave portion of the optical waveguide board formed at a region opposed to the flexible printed circuit board, and adhering the flexible printed circuit board and the optical waveguide board together by the adhesive member in such a manner that the light source is positioned to be opposed to an edge face of the optical waveguide board.

That is, as the first step, the adhesive members are provided in the concave portions of the optical waveguide board in advance. Thereafter, as the next step, the flexible printed circuit board is adhered to the optical waveguide board. According to such a production method, it is possible to efficiently produce an electro-optical device featuring a smaller gap between the flexible printed circuit board and the optical waveguide board, a significantly reduced optical leakage, and a smaller total thickness by the thickness of the adhesive members.

As still another aspect of the invention, the invention provides a method of producing an electro-optical device that includes an electro-optical panel, a light source that emits light that enters the electro-optical panel, an optical waveguide board that guides the light emitted from the light source toward the electro-optical panel, and a flexible printed circuit board on which the light source is mounted, where the electro-optical device production method includes the steps of: pasting an adhesive member having a predetermined shape to the flexible printed circuit board, and adhering the flexible printed circuit board and the optical waveguide board together by the adhesive member in such a manner that the adhesive member is positioned in a concave portion of the optical waveguide board formed at a region opposed to the flexible printed circuit board and that the light source is positioned to be opposed to an edge face of the optical waveguide board.

That is, as the first step, the adhesive members having a predetermined shape are pasted to the flexible printed circuit board in advance. Thereafter, as the next step, the flexible printed circuit board is adhered to the optical waveguide board. According to such a production method, it is possible to efficiently produce an electro-optical device featuring a smaller gap between the flexible printed circuit board and the optical waveguide board, a significantly reduced optical leakage, and a smaller total thickness by the thickness of the adhesive members.

As still another aspect of the invention, the invention provides an electronic apparatus having any one of the electro-optical devices described above.

That is, the invention provides a flat-shaped electronic apparatus that is provided with an electro-optical device which features a small or no gap between the flexible printed circuit board and the optical waveguide board and thus reduced optical leakage. Therefore, the electronic apparatus having such an electro-optical device provides stable brightness with less power consumption.

BRIEF DESCRIPTION OF THE DRAWINGS

The invention will be described with reference to the accompanying drawings, wherein like numbers reference like elements.

FIGS. 2A and 2B illustrate an example of the cross section of the liquid crystal device.

FIGS. 12A and 12B are explanatory diagrams that illustrate variation examples of the configuration of the liquid crystal device.

FIGS. 13A, 13B, and 13C explain a production method of the liquid crystal device according to a second embodiment of the invention.

DESCRIPTION OF EXEMPLARY EMBODIMENTS

Figure 1:
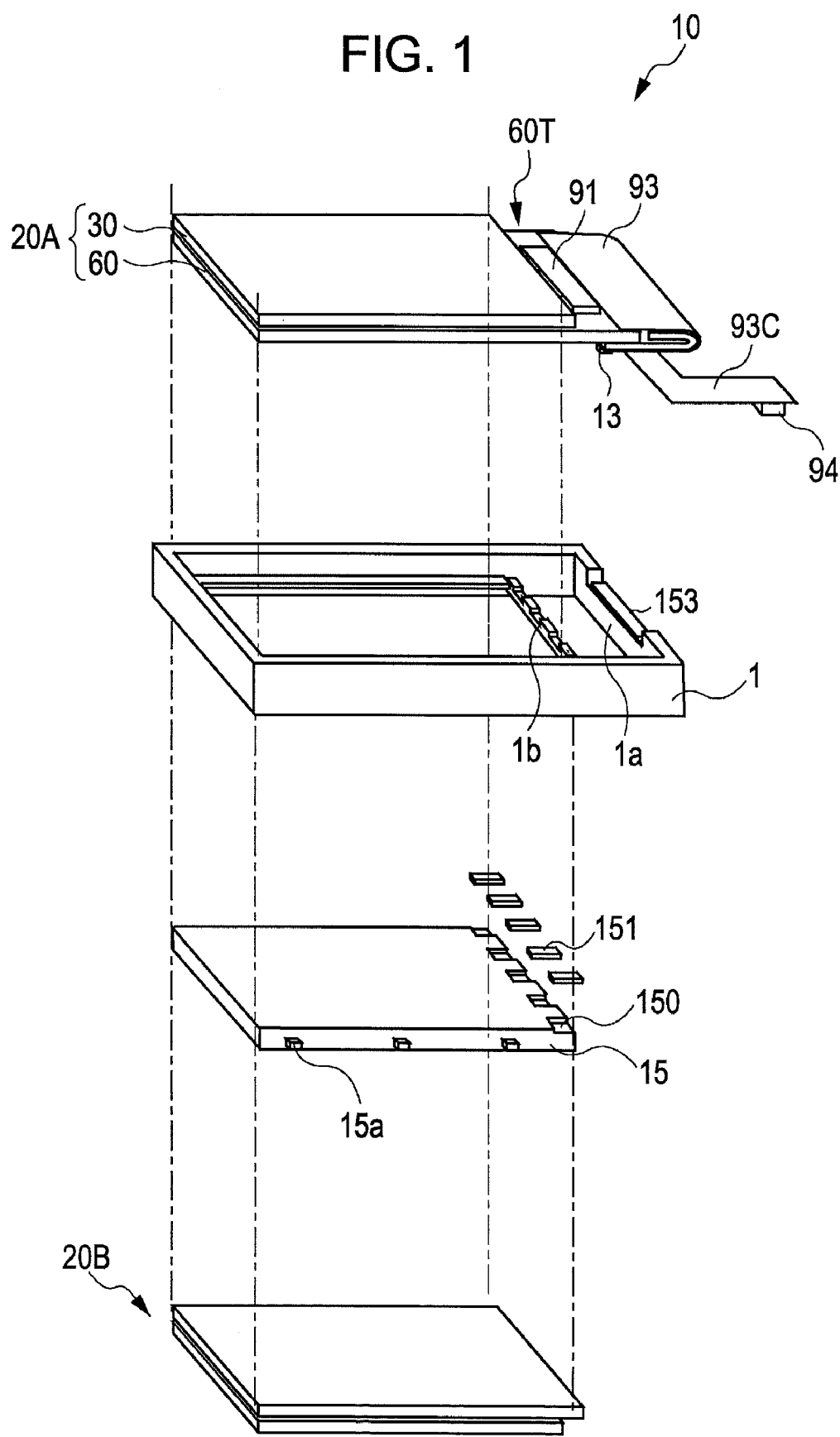
FIG. 1 schematically illustrates an exemplary structure of a liquid crystal device according to a first embodiment of the invention.

With reference to the accompanying drawings, a detailed explanation is given below of exemplary embodiments of an electro-optical device, an illumination device, an electronic apparatus, and a method for production of the electro-optical device according to the present invention. Needless to say, however, it should be understood that the specific exemplary embodiments described below are provided merely for the purpose of illustrating some modes of the invention, and therefore, never intended to limit the scope of the invention. Various arbitrary and discretionary modifications, alterations, changes, or adaptations can be made on the description given herein without departing from the spirit and scope of the invention.

First Embodiment

An electro-optical device according to a first embodiment of the invention is an apparatus that includes: an electro-optical panel; light sources that emit light that enters the electro-optical panel; an optical waveguide board that guides the light emitted from the light sources toward the electro-optical panel; and a flexible printed circuit board on which the light sources are mounted.

In the electro-optical device according to the present embodiment of the invention, the flexible printed circuit board is adhered to the optical waveguide board by adhesive members in such a manner that a part of the flexible printed circuit board is opposed to a surface of the optical waveguide board, and in addition thereto, the light sources are positioned to be opposed to an edge face of the optical waveguide board. As a further feature, in the electro-optical device according to the present embodiment of the invention, concave portions are formed in the optical waveguide board at least at positions where the adhesive members are provided.

In the following description, for the purpose of explanation, a double-sided liquid crystal device that is provided with a first liquid crystal panel and a second liquid crystal panel configured in such a manner that one of the panels is provided over the other so as to have a display surface (i.e., screen) on each of the front surface and the rear surface thereof is taken as an example of the electro-optical device according to the present embodiment. Notwithstanding the foregoing, however, the invention is not limited to an electro-optical device for double-sided display use but may be applied to an electro-optical device having a single main display surface.

It should be noted that, in the following explanation, the term "liquid crystal panel" refers to a structure in which a liquid crystal material is sandwiched between a pair of substrates one of which is pasted to the other by a sealant member. The term "liquid crystal device" refers to a structure in which a flexible printed circuit board, electronic parts, light sources, and so on, are mounted on a liquid crystal panel. It should be further noted that, throughout the accompanying drawings, the same reference numerals are consistently used to identify the same components, and redundant explanations thereof are omitted. On the other hand, some components are not shown in the accompanying drawings as it is deemed appropriate to omit them.

1. Basic Configuration

Figure 3A:
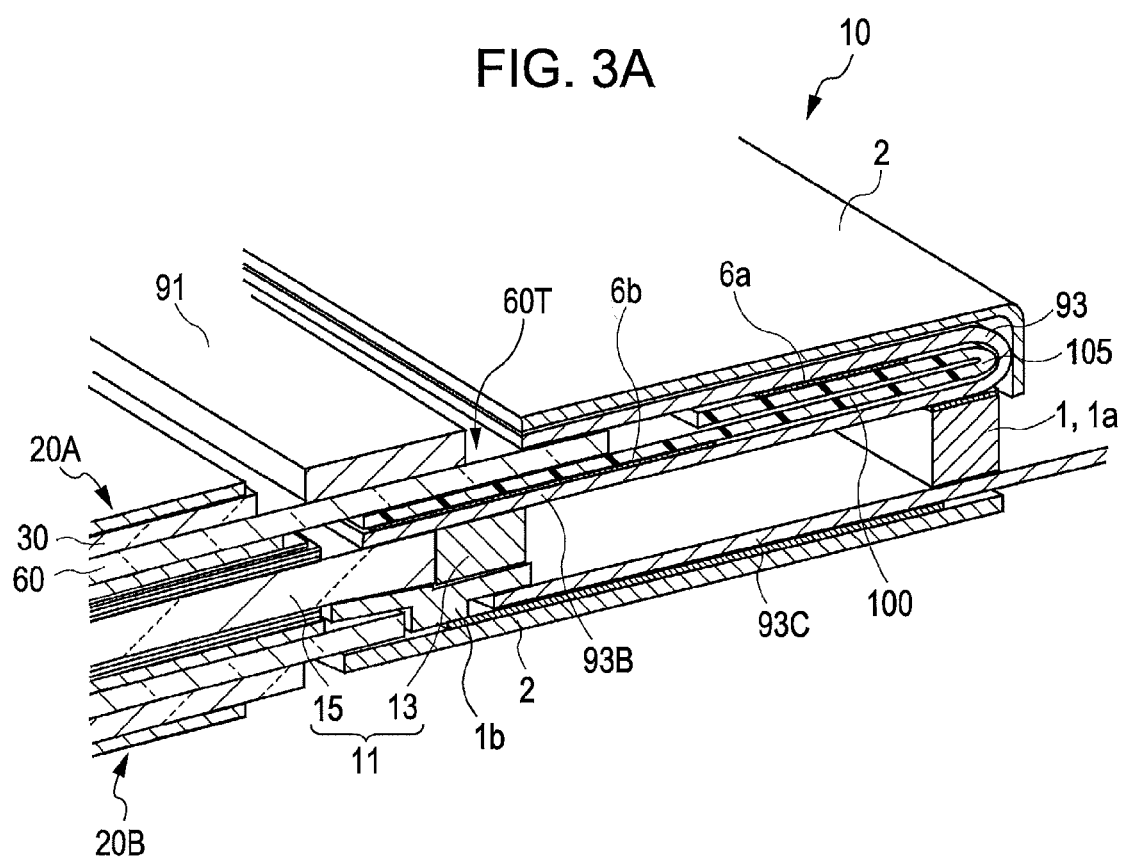
FIGS. 3A and 3B are close-up perspective views that illustrate, on a larger scale, the cross section in the neighborhood of a connection portion to which a flexible printed circuit board is connected in the liquid crystal device.
Figure 3B:
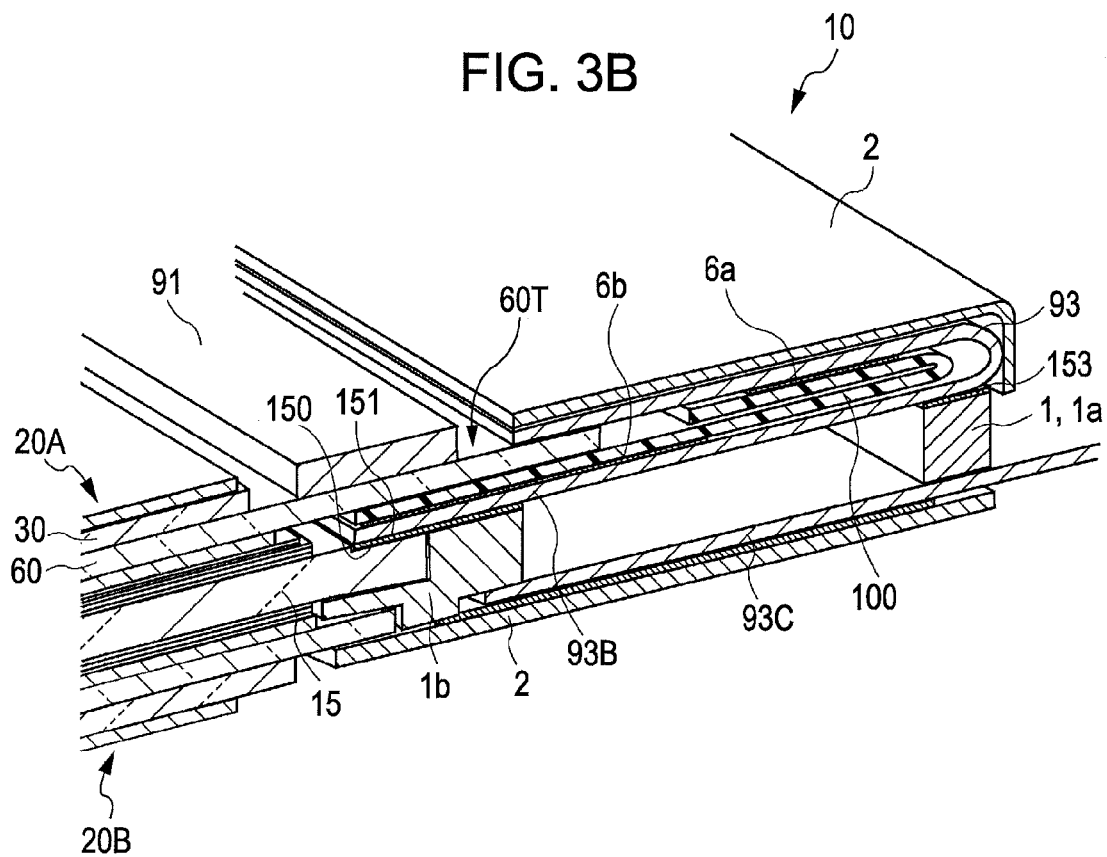

First of all, the basic configuration of a liquid crystal device according to the present embodiment of the invention is described below. FIG. 1 is a perspective view that schematically illustrates an exemplary configuration of a liquid crystal device 10 according to the present embodiment of the invention. FIG. 2A is a sectional view of the liquid crystal device 10 that is taken along a line passing through a light source 13. On the other hand, FIG. 2B is a sectional view of the liquid crystal device 10 that is taken along a line not passing through the light source 13. FIGS. 3A and 3B are close-up perspective views that illustrate, on a larger scale, the cross section in the neighborhood of a connection portion to which a flexible printed circuit board 93 is connected in the liquid crystal device 10. Specifically, FIG. 3A is a perspective view that illustrates a cross section thereof that is taken along a line passing through the light source 13, whereas FIG. 3B is a perspective view that illustrates a cross section thereof that is taken along a line not passing through the light source 13.

As illustrated in these FIGS. 1 to 3, the liquid crystal device 10 according to the present embodiment of the invention has a first liquid crystal panel 20A and a second liquid crystal panel 20B, each of which is constituted by two substrates, each having electrode(s) thereon, and pasted to each other by a sealant member and by a liquid crystal material sandwiched in a cell area therebetween. An optical waveguide board 15 that constitutes a part of an illumination device 11 is sandwiched between the first liquid crystal panel 20A and the second liquid crystal panel 20B. The first liquid crystal panel 20A, the second liquid crystal panel 20B, and the optical waveguide board 15 are accommodated/housed into a frame-shaped chassis 1, which is made of plastic or the like. An external metal frame 2 (not shown in FIG. 1) clamps this structure for further fixation thereof.

In addition to the above-described configuration, one of the substrates of the first liquid crystal panel 20 (specifically, an element substrate 60) has a substrate protrusion portion 60T, which protrudes outward in such a manner that the element substrate 60 extends beyond the outer edge of a counter substrate (i.e., opposing substrate) 30. External connection terminals (not shown in the drawing) are provided on one surface of the substrate protrusion portion 60T, specifically, one side thereof contacting the liquid crystal material. A semiconductor device 91 and the flexible printed circuit board 93 are connected to the external connection terminals. The light sources 13 are mounted on the flexible printed circuit board 93. The illumination device 11 is made up of the light sources 13 and the optical waveguide board 15. The optical waveguide board 15 is sandwiched between the first liquid crystal panel 20A and the second liquid crystal panel 20B. Light emitted from the light sources 13 is guided by the optical waveguide board 15. Then, the guided light enters the first liquid crystal panel 20A or the second liquid crystal panel 20B.

2. Liquid Crystal Panel

Typical examples of the first liquid crystal panel 20A and the second liquid crystal panel 20B include, without any limitation thereto, an active matrix type liquid crystal panel that is provided with switching elements such as thin film transistor (TFT) devices or thin film diode (TFD) devices, or a passive matrix type liquid crystal panel that is not provided with any switching elements. The following description takes, as an example, the configuration of an active matrix type liquid crystal panel that is provided with TFT devices.

Figure 4:
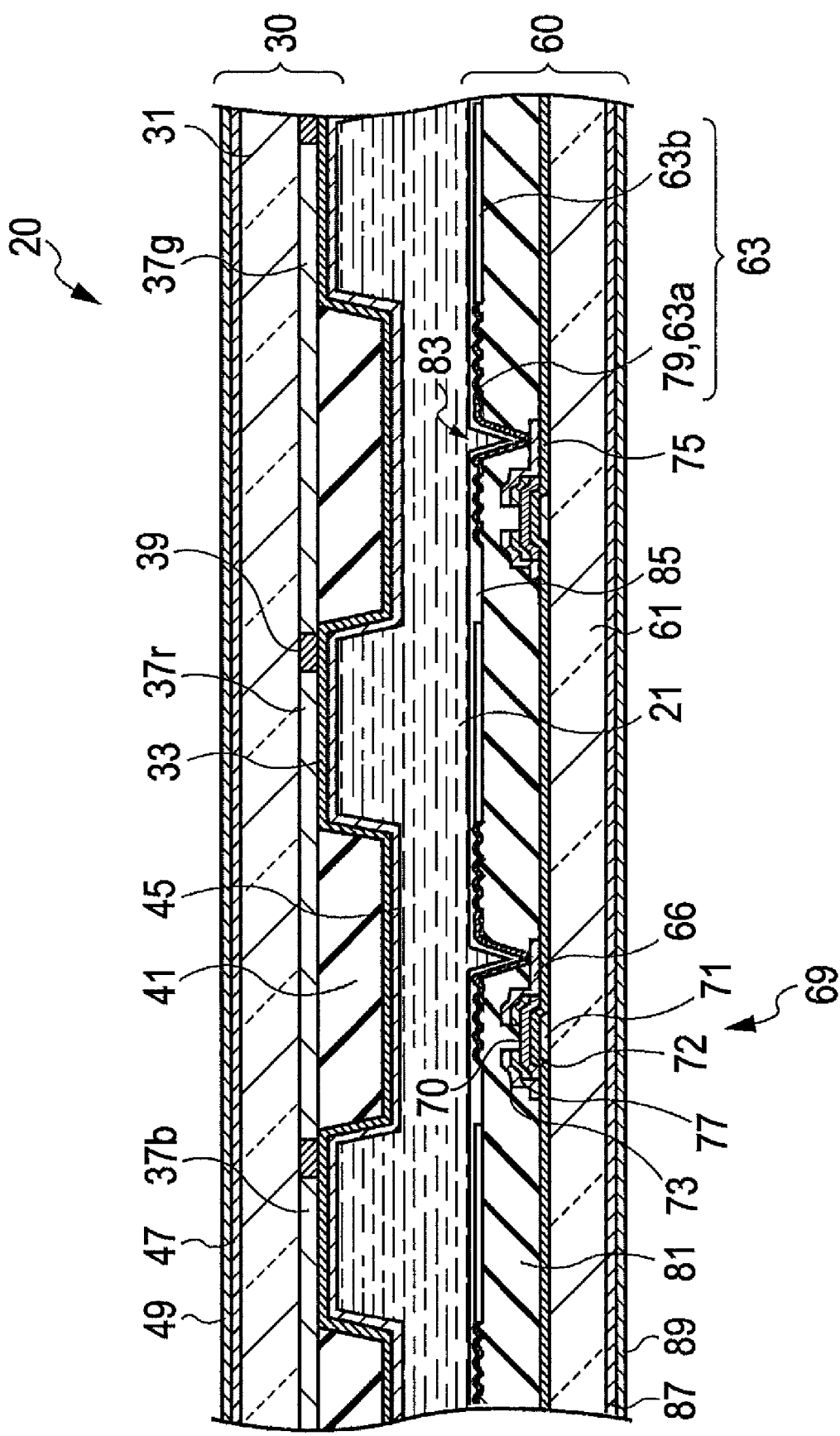
FIG. 4 is a partially enlarged sectional view that illustrates a liquid crystal panel.

FIG. 4 is a partially enlarged sectional view that illustrates an active matrix type liquid crystal panel 20 that is provided with TFT devices. As illustrated in FIG. 4, the liquid crystal panel 20 includes the element substrate 60, which has TFT devices functioning as switching elements, and the counter substrate 30, which is opposed to the element substrate 60 and has color filters 37 (or correctively, color filter 37). A phase-difference-film polarizing plate 50, which is made up of a lamination of a phase difference film 47 and a polarizing plate 49, is deposited on the outer surface (i.e., upper side in FIG. 4) of the counter substrate 30. On the other hand, a phase-difference-film polarizing plate 90, which is made up of a lamination of a phase difference film 87 and a polarizing plate 89, is similarly deposited on the outer surface (i.e., lower side in FIG. 4) of the element substrate 60. The aforementioned illumination device (not shown in the drawing) is provided under the element substrate 60.

In the liquid crystal panel 20 described above, the counter substrate 30 has a substrate 31 made of glass, plastic, etc. as a base substance, the color filter 37 that consists of a plurality of colored layers 37r, 37g, and 37b each of which has a unique color phase different from the other two, a counter electrode 33 formed on the color filter 37, and an alignment film (i.e., orientation film) 45 deposited on the counter electrode 33. A transparent resin layer 41, which functions to optimize each of the retardation of a reflective region and a transmissive region, is provided between the color filter 37 and the counter electrode 33.

Herein, the counter electrode 33 is a planar electrode that is made of indium tin oxide (ITO), among other materials, and is thus formed on the entire surface of the counter substrate 30. The color filter 37 consists of a plurality of colored layers each of which has a unique color phase, that is, red (R), green (G), or blue (B). The color filter 37 is arranged in such a manner that each of the pixel regions corresponding to pixel electrodes 63 provided at the opposite element substrate (60) side outputs light having a predetermined color phase. A light shielding film 39 is provided at a region corresponding to a gap between each of the adjacent pixel regions.

As an orientation treatment (i.e., alignment treatment), an alignment film 85, which is made of polyimide resin deposited on the surface, is subjected to rubbing treatment.

The element substrate 60, which is opposed to the counter substrate 30, has a substrate 61 made of glass, plastic, etc. as a base substance, active TFT devices 69 that function as switching elements, the pixel electrodes 63 that are formed above the TFT devices 69 with a transparent insulation film 81 interposed therebetween, and the alignment film 85 deposited on the pixel electrodes 63.

Herein, each of the pixel electrodes 63 illustrated in FIG. 4 is formed partly as a light reflective film 79 (63a) for providing reflective display in the reflective region, and partly as a transparent electrode 63b made of ITO, etc., in the transmissive region. The light reflective film 79 that constitutes a part of the pixel electrode, which is denoted as 63a, is made of light reflective material such as aluminum (Al), silver (Ag), and so forth. Notwithstanding the foregoing, however, the configuration of the pixel electrode and/or the light reflective film is not limited to the specific example illustrated in FIG. 4. As an alternative example, it may be configured that the entire pixel electrode is made of ITO or the like, and a reflective film made of aluminum or the like is provided thereon as another member.

As an orientation treatment (i.e., alignment treatment), the alignment film 85, which is made of polyimide resin deposited on the surface, is subjected to rubbing treatment.

In addition, each of the TFT devices 69 has a gate electrode 71 that is formed on the substrate 61 of the element substrate 60, a gate insulation film 72 that is deposited above the gate electrode 71 to extend over the entire region of the substrate 61 of the element substrate 60, a semiconductor layer 70 that is deposited above the gate electrode 71 with the gate insulation film 72 interposed therebetween, a source electrode 73 that is formed at one side of the semiconductor layer 70 with a contact electrode 77 interposed therebetween, and a drain electrode 66 that is formed at the other side of the semiconductor layer 70 with the contact electrode 77 interposed therebetween.

Each of the gate electrodes 71 extends from a gate bus line, which is not shown in the figure, whereas each of the source electrodes 73 extends from a source bus line, which is also not shown in the figure. Each of the gate bus lines extends in the horizontal direction of the element substrate 60, and the plurality of the gate bus lines are arranged in parallel with one another at equal intervals in the vertical direction thereof. The source bus line extends in the vertical direction in such a manner that it intersects with the gate bus lines with the gate insulation film 72 interposed therebetween, whereas, when viewed in the horizontal direction, the plurality of the source bus lines are arranged in parallel with one another at equal intervals.

The gate bus line is connected to a liquid crystal driving IC, which is not shown in the drawing, so as to function as, for example, a scanning line. On the other hand, the source bus line is connected to another driving IC, which is also not shown in the drawing, so as to function as, for example, a signal line.

Each of the pixel electrodes 63 is defined as a quadrangular region that is demarcated by the gate bus lines and the source bus lines that intersect each other except for a region corresponding to the TFT device 69. Thus, the pixel electrode 63 constitutes the pixel region as a unit thereof.

The gate bus line and the gate electrode may be made of, for example, chromium, tantalum, or the like. The gate insulation film may be made of, for example, silicon nitride ($SiN_x$), silicon oxide ($SiO_x$), or the like. The semiconductor layer may be made of, for example, doped a-Si, polycrystalline silicon, CdSe, or the like. The contact electrode may be made of, for example, a-Si or the like. The source electrode and the source bus line, which form an integral component together, as well as the drain electrode may be made of, for example, titanium, molybdenum, aluminum, and so on.

An organic compound insulation film 81 is deposited over the entire region in the element substrate 60 so as to cover the gate bus line, the source bus line, and the TFT device. A contact hole 83 is provided at a position of the organic compound insulation film 81 corresponding to each of the drain electrodes 66. Conduction/continuity between the pixel electrode 63 and the drain electrode 66 of the TFT device 69 is ensured through the contact hole 83.

The organic compound insulation film 81 has a concavo-convex resin film deposited thereon, which has a regular or irregular light-scattering repetitive pattern consisting of ridge portions and valley portions at each of regions corresponding to the reflective regions R. Accordingly, the light reflective film 79 (63a) that is to be laminated on the organic compound insulation film 81 has also a concavo-convex light reflection pattern. It should be noted that such a concavo-convex pattern is not formed at any of the transmissive regions T.

In the liquid crystal panel having the configuration described above, external light such as solar light or indoor illumination light enters the liquid crystal panel 20 from the counter electrode (30) side to pass through the color filter 37, the liquid crystal material 21, etc., to reach the light reflective film 79. The light is then reflected at the light reflective film 79 to pass through, again in the reverse order, the color filter 37, the liquid crystal material 21, etc., to go out of the liquid crystal panel 20. This is how reflective display is carried out. On the other hand, transmissive display is carried out as follows. The illumination device is turned on to transmit light into the liquid crystal panel 20. The incident light then passes through the light-transmissive transparent electrode 63b. Thereafter, the light further goes through the color filter 37, the liquid crystal material 21, etc., to go out of the liquid crystal panel 20. This is how the transmissive display is carried out.

Then, this light emitted from the individual pixel regions is visually recognized as a whole through color mixing so that various color displays on a pixel-region-by-pixel-region basis are perceived as color images that are constituted by the entire display region.

3. Illumination Device

Figure 5A:
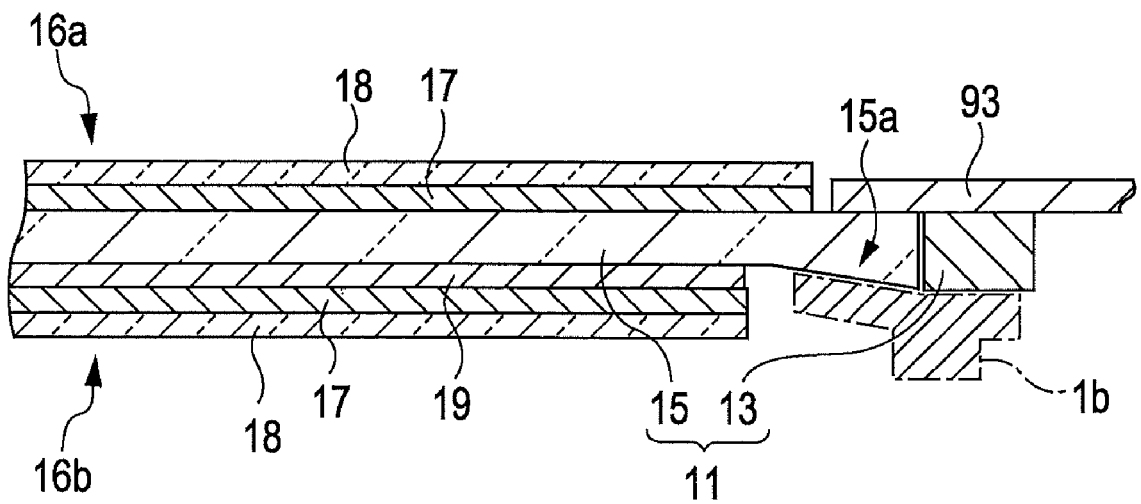
FIGS. 5A and 5B illustrate an example of the configuration of an illumination device that is provided in the liquid crystal device for double-sided display use.
Figure 5B:
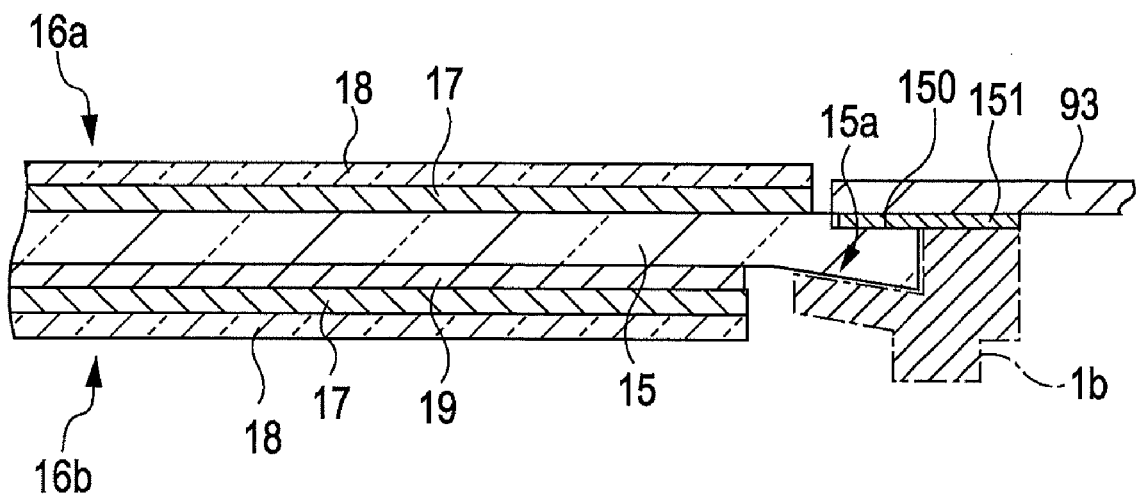

FIGS. 5A and 5b illustrate an example of the configuration of the illumination device 11 that is provided in the liquid crystal device for double-sided display use according to the present embodiment of the invention. FIG. 5A is a sectional view that illustrates a cross section thereof that is taken along a line passing through the light source 13, whereas FIG. 5B is a sectional view that illustrates a cross section thereof that is taken along a line not passing through the light source 13.

As has already been described, the illumination device 11 includes the light sources 13 and the optical waveguide board 15. Although a typical example of the light sources 13 is an LED, the invention is not limited to such a specific example. Other than the LED, for example, an organic electroluminescence device, a semiconductor laser such as an edge-face light-emitting semiconductor laser or a surface light-emitting laser (i.e., a plane emission laser), a fluorescent tube such as a cold-cathode tube, or the like, may be used.

The optical waveguide board 15 has a first light-emitting surface 16a and a second light-emitting surface 16b that face to the first liquid crystal panel and the second liquid crystal panel, respectively. A diffusion plate 17 and a prism sheet 18 are provided at the first light-emitting surface (16a) side, whereas a transflection plate 19, a diffusion plate 17, and a prism sheet 18 are provided at the second light-emitting surface (16b) side. Accordingly, among all of light emitted from the light sources 13 toward the first light-emitting surface 16a, some of the light passes through the first light-emitting surface 16a and then is diffused to enter the first liquid crystal panel, whereas other light is reflected toward the second light-emitting surface 16b. Then, among all of the light that is reflected toward the second light-emitting surface 16b, likewise the foregoing operation, some of the light passes through the second light-emitting surface 16b and then is diffused to enter the second liquid crystal panel, whereas other light is reflected again toward the first light-emitting surface 16a. As light propagates inside the optical waveguide board while repeating reflections/transmissions as described above, it is possible to emit light with uniform diffusion over the entire display surface of each of the first liquid crystal panel and the second liquid crystal panel.

The optical waveguide board 15 has a slope portion 15a at the edge portion thereof where the light sources 13 are provided adjacently. The thickness of the "light-source side" of the slope portion 15a is configured to be larger than that of the opposite side thereof such that light emitted from the light sources 13 can be efficiently utilized, and that the light should reach points at a distance from the light sources 13.

Figure 6A:
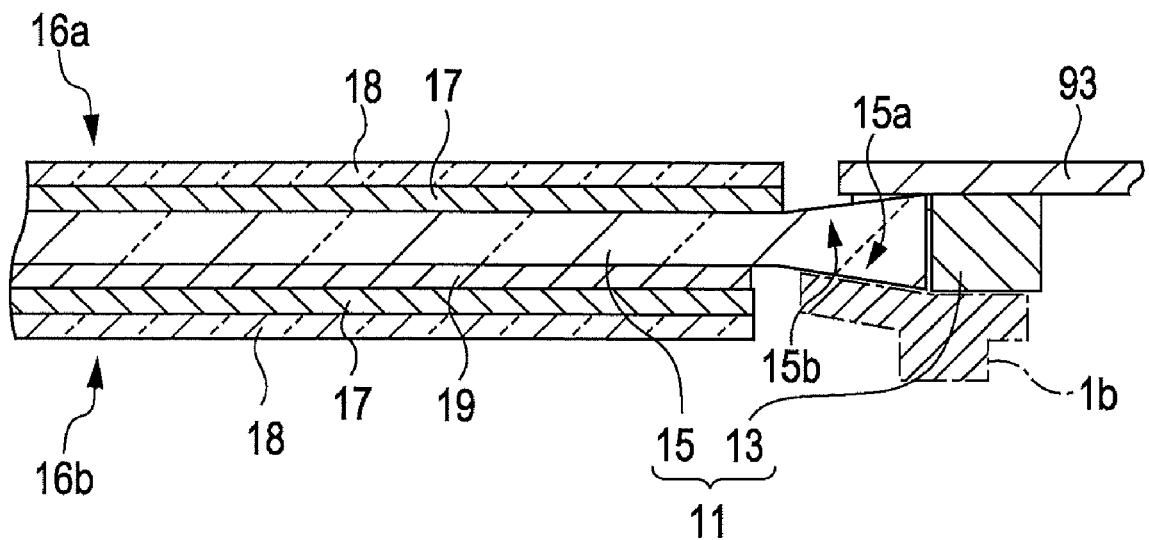
FIGS. 6A and 6B illustrate the illumination device having a slope portion at either surface of an optical waveguide board.
Figure 6B:
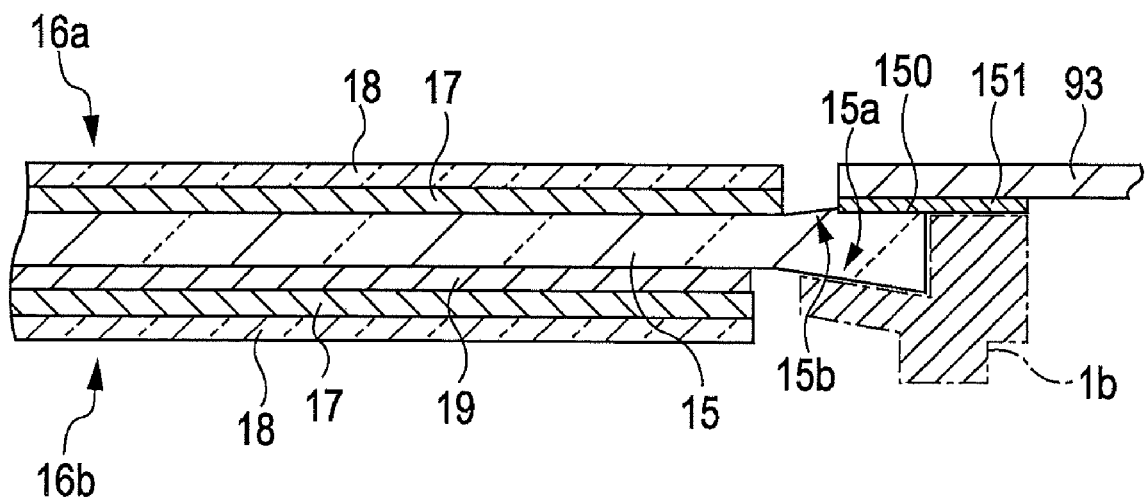

In the illumination device 11 illustrated in FIGS. 5A and 5B, the slope portion 15A is formed at only one surface of the optical waveguide board 15 opposite the other surface thereof which the flexible printed circuit board 93 is adhered to. However, the invention is not limited to such a specific example. As an alternative configuration, as illustrated in FIGS. 6A and 6B, the slope portion 15A may be provided at one surface of the optical waveguide board 15, and the slope portion 15B may be provided at the other surface thereof.

As illustrated in FIG. 2, the light sources 13 that constitute a part of the illumination device 11 are mounted on the flexible printed circuit board 93, which is connected to the substrate protrusion portion 60T of the element substrate 60 that constitute a part of the first liquid crystal panel 20A. The flexible printed circuit board 93 is partially opposed to the element substrate 60, and is connected to the external connection terminals (not shown in the drawing). The flexible printed circuit board 93 extends toward a region where it does not overlap the element substrate 60. At a certain point in the region, the flexible printed circuit board 93 is bent back toward a rear surface of the element substrate 60, which is opposite the other surface contacting the liquid crystal material, to overlap the element substrate 60 again.

Figure 7:
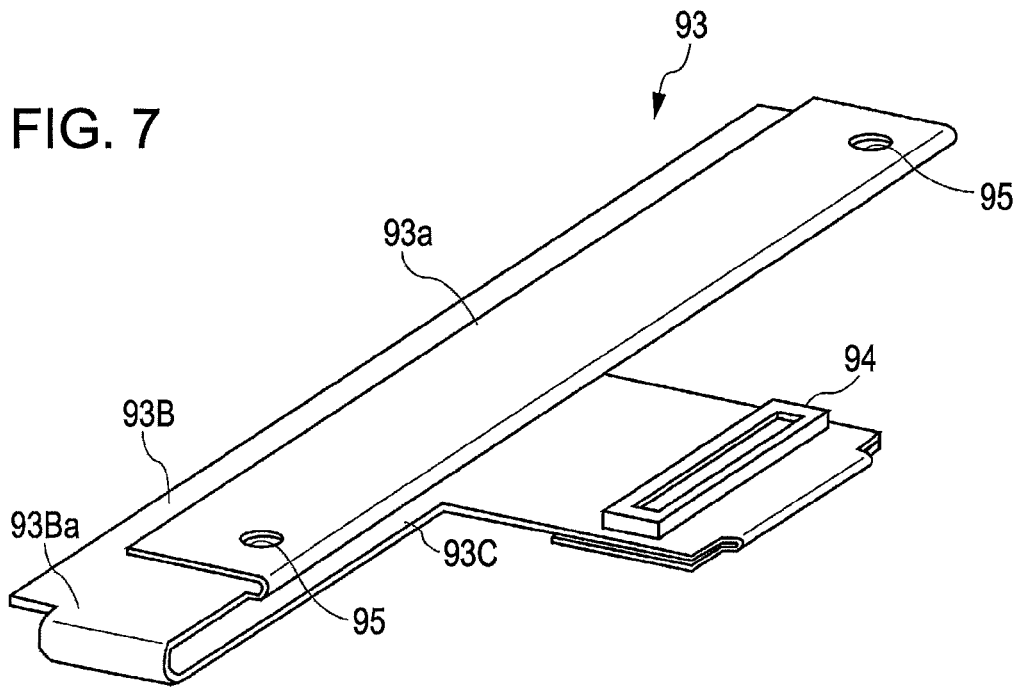
FIG. 7 is a perspective view that illustrates the flexible printed circuit board provided in the liquid crystal device.
Figure 8:
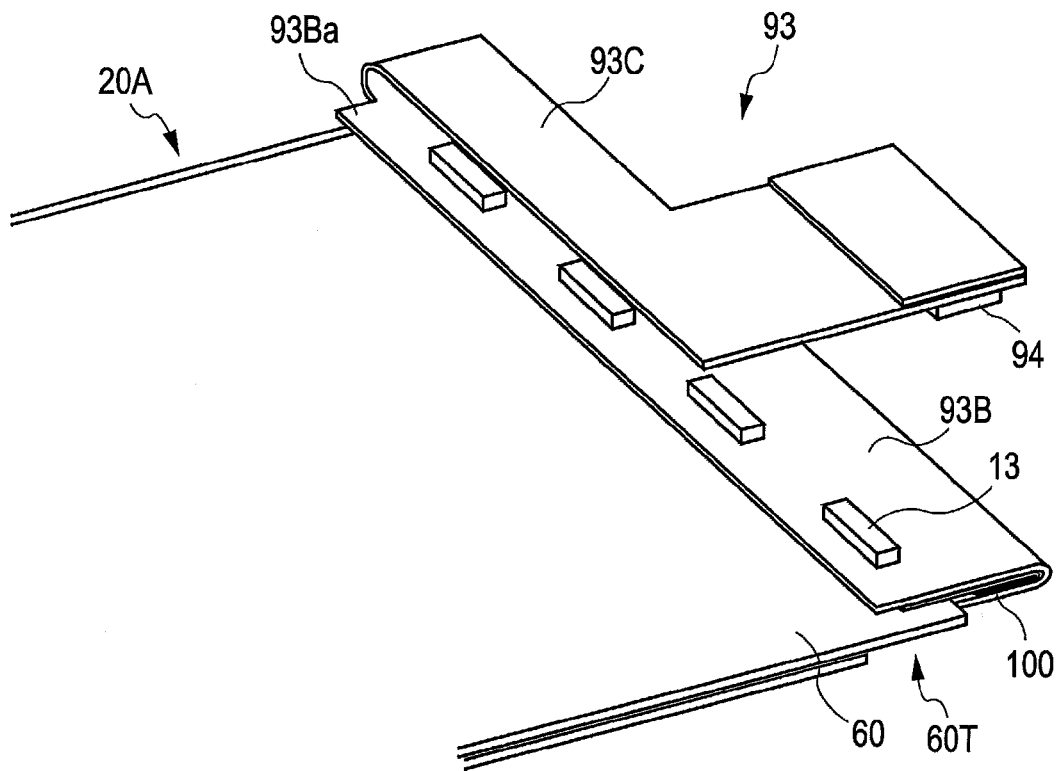
FIG. 8 is a perspective view that illustrates a first liquid crystal panel with the flexible printed circuit board attached thereto, which are viewed from a rear surface side opposite the display surface thereof.

FIG. 7 is a perspective view that illustrates the flexible printed circuit board 93 provided in the liquid crystal device according to the present embodiment of the invention. FIG. 8 is a perspective view that illustrates the first liquid crystal panel 20A with the flexible printed circuit board 93 attached thereto, which are viewed from a rear surface side opposite the display surface thereof.

The flexible printed circuit board 93 is a light-source-driving flexible printed wiring board. On a flexible substrate made of polyimide resin or the like, which serves as a base substance, the flexible printed circuit board 93 has the light sources 13, a circuit pattern (not shown in the drawing) that functions to communicate signals to the light sources 13, and an insulation film (also not shown in the drawing) that covers the circuit pattern to ensure insulation from the outside.

The flexible printed circuit board 93 is connected to the element substrate 60 at one end portion 93a thereof. The flexible printed circuit board 93 is bent back from the end portion 93a to provide a plane portion 93B on which the light sources 13 are mounted. At one end of the light-source plane portion 93B, the flexible printed circuit board 93 is further bent back. The second bent-back end of the light-source plane portion 93B of the flexible printed circuit board 93 is denoted as 93Ba in the drawing. A connector 94 is provided at an open end, opposite the bent-back end, of the plane portion 93C of the flexible printed circuit board 93, which is provided by bending back the flexible printed circuit board 93 at the bent-back end 93Ba.

The flexible printed circuit board 93 has a configuration that includes a circuit for driving the light sources and circuits for driving the first and second liquid crystal panels. As these circuits are combined on a single flexible printed wiring board, and this flexible printed wiring board is bent back twice, the number of parts is reduced to ensure the miniaturization of a device.

In the liquid crystal device according to the present embodiment of the invention, in order to prevent the optical axis of the light sources from getting shifted, as illustrated in FIGS. 1 and 3, the flexible printed circuit board 93 on which the light sources 13 are mounted is adhered to the optical waveguide board 15 and the chassis 1a and 1b by adhesive members 151 and 153, respectively, for fixation thereof at positions where the light sources are opposed to an edge face of the optical waveguide board 15. The optical waveguide board 15 is provided with concave portions 150 in such a manner that the adhesive members 151, which stick the flexible printed circuit board 93 and the optical waveguide board 15 together, fit into the concave portions 150.

With such a configuration, it is possible to fix the optical waveguide board 15 and the flexible printed circuit board 93 together while ensuring a small or, theoretically, no gap therebetween. In addition, with such a configuration, it is further possible to significantly reduce optical leakage, thereby making it further possible to ensure stable brightness.

As the adhesive members 151, for example, a double-faced adhesive tape having a laminated structure including a first adhesive layer, a resin film layer, and a second adhesive layer may be used. As the adhesive layer, it is preferable to employ an adhesive film because it provides a uniform thickness. More specifically, the adhesive film may be selected from a group consisting of acrylic adhesive, polyester adhesive, rubber adhesive, urethane adhesive, epoxy adhesive, silicon adhesive, phenolic adhesive, or a combination of two or more thereof.

Figure 9A:
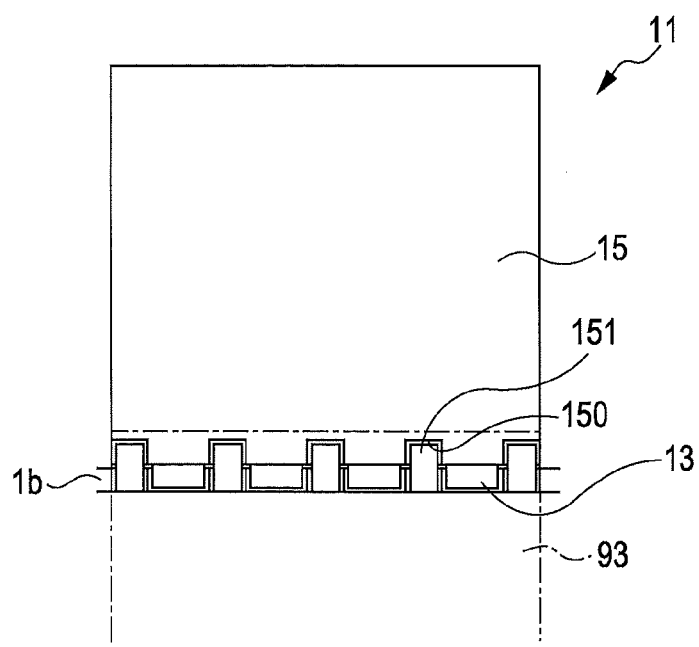
FIGS. 9A and 9B are explanatory diagrams that illustrate concave portions provided in the optical waveguide board.
Figure 9B:
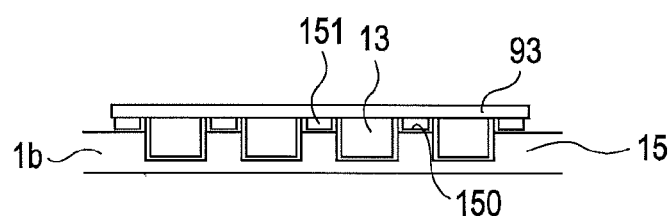

FIG. 9A illustrates a plane view of the illumination device 11, which is viewed from the light-emitting-surface side of the optical waveguide board 15. FIG. 9B illustrates a side view thereof, which is viewed from the end portion adjacent to which the light sources 13 are provided. As illustrated in FIGS. 9A and 9B, in the liquid crystal device according to the present embodiment of the invention, four LEDs are employed as the light sources 13 that constitute a part of the illumination device 11. The optical waveguide board 15 has five concave portions 150, each one of the central three of which is formed at a position between two adjacent ones of the plurality of (herein, four) light sources 13. The adhesive members 151 are provided in such a manner that each of them overlies both of the concave portion 150 of the optical waveguide board 15 and a part of the chassis 1b to bridge across the border therebetween. The concave portions 150 are formed at the end portion of the optical waveguide board 15.

Having such an arrangement of components, the illumination device according to the present embodiment of the invention has the concave portions 150 and the adhesive members 151 which are provided between adjacent light sources 13. The presence of the concave portions 150 and the adhesive members 151 makes it possible to prevent any reduction in the amount of light that enters the liquid crystal panel due to absorption of light coming from the light source or irregular/diffused reflection thereof. It is further possible to prevent any interference fringe/pattern appearing in the display region, which could occur if any adhesive members exist on an optical path from the light source.

It should be noted that, in this specification, the term "positions between the plurality of light sources 13" means not only each region between two adjacent light sources provided on the flexible printed circuit board but also an additional region thereof that extends from said each region between two adjacent light sources in a direction orthogonal to the light-source arrangement direction.

In an example of the illumination device 11 illustrated in FIG. 9A, the planar shape of each of the concave portions 150 is configured to substantially match the planar shape of the optical-waveguide-board adhesion area of the corresponding adhesive member 151 such that the corresponding adhesive member 151 fits into the concave portion 150. With such a concave portion that is configured to match the shape of the adhesive member, there will be theoretically no clearance or gap at the periphery of the adhesive member inside the concave portion, thereby effectively reducing optical leakage.

However, in a practical sense, if a perfect match is pursued, there is a risk that the adhesive member could be pressed out of the concave portion due to any slight positional displacement therebetween. Therefore, it is preferable in actual implementation of the invention that the size of the adhesive member and that of the concave portion are determined respectively so as to ensure that some clearance (i.e., gap) of approximately 0.1 mm to 0.5 mm is provided therebetween.

In addition, as illustrated in FIG. 9B, the depth of each of the concave portions 150 provided in the optical waveguide board 15 is configured to be equal to the thickness of the corresponding adhesive member 151 in a bonded state. With such a configuration, it is possible to make regions at which the adhesive members 151 are provided level with other regions such that the surface position of the former is the same as that of the latter. Therefore, it is possible to securely fix the flexible printed circuit board 93 to the optical waveguide board 15, and to effectively prevent any optical leakage from a gap between the flexible printed circuit board 93 and the optical waveguide board 15. In addition, it is possible to reduce the total thickness of the liquid crystal device by the thickness of the adhesive member 151.

To put it another way, if the depth of the concave portion 150 is smaller than the thickness of the adhesive member 151, some gap will be left between the flexible printed circuit board 93 and the optical waveguide board 15 when these are adhered together, which makes the device more susceptible to optical leakage. In addition to such a disadvantage, the total thickness of the liquid crystal device is increased by the size of the clearance (gap). On the other hand, if the depth of the concave portion 150 is larger than the thickness of the adhesive member 151, adhesive strength decreases, which could invite the positional shift of the optical axis.

Figure 10:
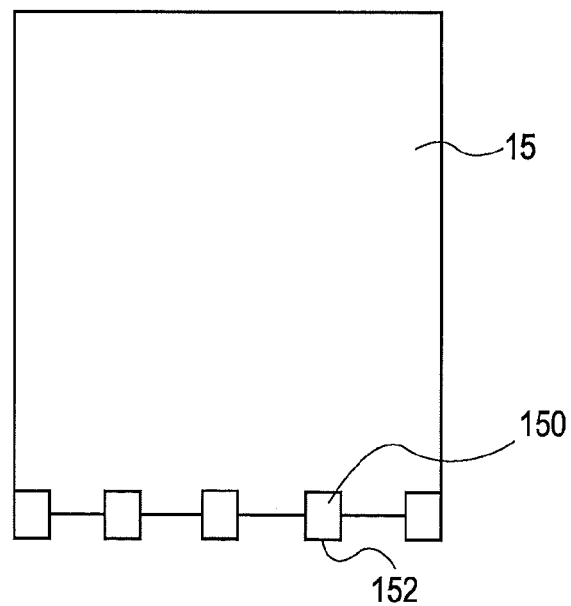
FIG. 10 is an explanatory diagram that illustrates the optical waveguide board that has protruding portions.

In addition to the above-described configuration, it is preferable that protruding portions 152 are provided between the plurality of light sources in the optical waveguide board 15, and that the concave portions 150 are provided at the protruding portions 152 as illustrated in FIG. 10.

With such a configuration, it is possible to increase the area at which the optical waveguide board 15 and the flexible printed circuit board 93 are adhered together by the adhesive members to increase adhesive strength for the optical waveguide board 15 and the flexible printed circuit board 93. Thus, it is possible to avoid any positional shift in the optical axis.

In the liquid crystal device 10 according to the present embodiment of the invention, the flexible printed circuit board 93 is fixed not only to the optical waveguide board 15 but also to the chassis 1a and 1b (refer to FIGS. 2 and 3). In such a configuration, the flexible printed circuit board 93 is fixed securely both to the optical waveguide board 15 and the chassis 1a and 1b. Therefore, the positional relationship between these components is maintained without any shift so as to ensure stable brightness.

Figure 11A:
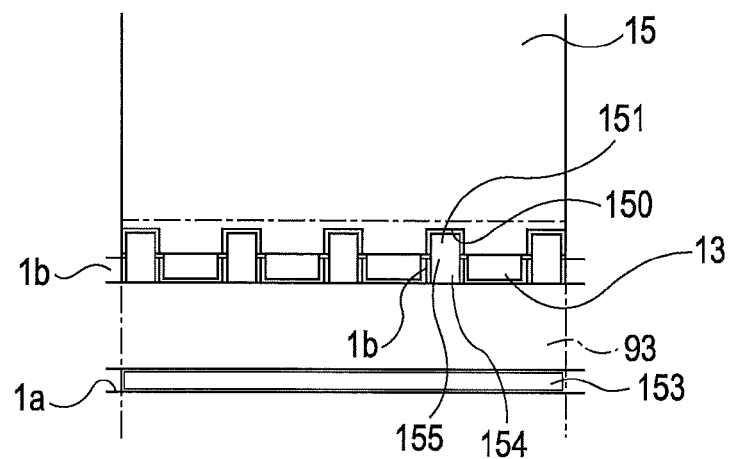
FIGS. 11A, 11B, and 11C are explanatory diagrams that show the illustrative embodiments of adhesive members.

When the flexible printed circuit board 93 is fixed both to the optical waveguide board 15 and the chassis 1a and 1b, as illustrated in FIG. 11A, the same adhesive members 151 can be used for regions 154 where the flexible printed circuit board 93 is fixed to the chassis 1b and for regions 155 where the flexible printed circuit board 93 is fixed to the optical waveguide board 15. As the integral-type adhesive members 151 are used as described above, it is possible to provide the adhesive members 151 just in a single step of production, which enhances production efficiency. Moreover, the use of the integral-type adhesive members 151 increases bonding area, resulting in more secure fixation of the flexible printed circuit board. Therefore, it is possible to configure an illumination device that is less vulnerable to optical-axis shift in efficient production.

Figure 11B:
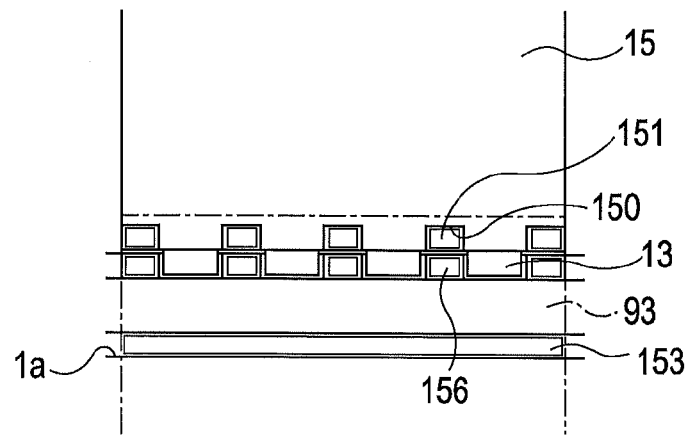

On the other hand, as illustrated in FIG. 11B, separate adhesive members 151, 153, and 156 may be used alternatively. Specifically, the adhesive member 153 for fixing the flexible printed circuit board 93 to the chassis 1a, the adhesive members 151 for fixing the flexible printed circuit board 93 to the optical waveguide board 15, and the adhesive members 156 for fixing the flexible printed circuit board 93 to the chassis 1b may be used.

Figure 11C:
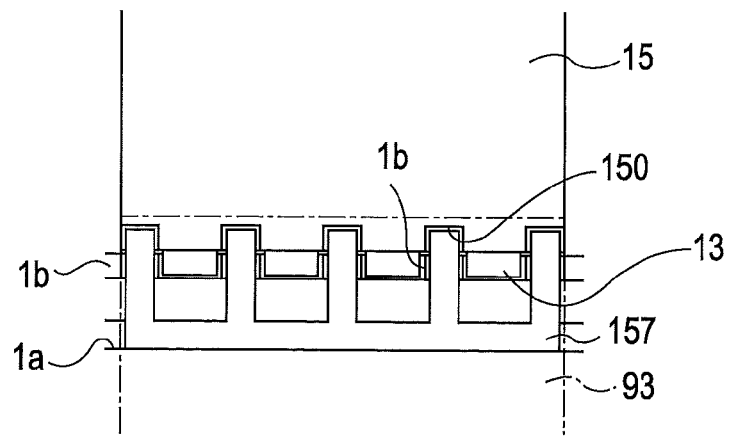

Furthermore, if the position of the chassis 1a is relatively closer to the optical waveguide board 15, as illustrated in FIG. 11C, the same and single adhesive member 157 may be used for a region where the flexible printed circuit board 93 is fixed to the chassis 1a, for a region where the flexible printed circuit board 93 is fixed to the optical waveguide board 15, and for a region where the flexible printed circuit board 93 is fixed to the chassis 1b.

4. Variation

In the liquid crystal device 10 according to the above-described embodiment of the invention, the bent-back flexible printed circuit board 93 having the light sources 13 mounted thereon is fixed to the optical waveguide board 15 in such a manner that the flexible printed circuit board 93 is partially sandwiched between the element substrate 60, which the flexible printed circuit board 93 is connected to, and the optical waveguide board 15. The invention is, however, not limited to such an exemplary configuration.

For example, in a liquid crystal device 180 illustrated in FIG. 12, which has a single liquid crystal panel 183 and thus a single main display surface, a bent-back flexible printed circuit board 184 having the light sources 186 mounted thereon is provided on one surface of the optical waveguide board 15 opposite the other surface thereof where the latter faces toward the liquid crystal panel 183, in other words, on the surface of the optical waveguide board 15 opposite the light-emitting surface. The flexible printed circuit board 184 having such a configuration is adhered not only to the optical waveguide board 15 but also to padding members 193 that have a function of, without any limitation thereto, preventing any malfunction caused when light emitted from the light sources 186 reach the active faces of semiconductor devices 187. The same adhesive members 191 are used both for the optical waveguide board 185 and for the padding members 193. The optical waveguide board 185 has concave portions 190 provided at positions corresponding to those of the adhesive members 191.

Therefore, it is possible to ensure a small or, theoretically, no gap between the flexible printed circuit board 184 and the optical waveguide board 185. In addition, it is further possible to reduce the total thickness of the liquid crystal device 180 by the thickness of the adhesive members 191.

Second Embodiment

The second embodiment of the invention discloses a production method of the liquid crystal device explained in the foregoing description on the first embodiment of the invention. In particular, the second embodiment of the invention discloses a method of manufacturing a liquid crystal device, which includes the production steps of: providing adhesive members in concave portions formed at a region opposed to a flexible printed circuit board, and adhering the flexible printed circuit board and an optical waveguide board together by the adhesive members in such a manner that light sources are positioned to be opposed to an edge face of the optical waveguide board.

In the following description, a method for production of the liquid crystal device for double-sided display use explained in the first embodiment of the invention with reference to FIG. 1 is taken as an example of a production method of an electro-optical device according to the present embodiment of the invention.

1. Production of First and Second Liquid Crystal Panels

As a first step, a first liquid crystal panel and a second liquid crystal panel each of which includes an element substrate and a color filter substrate opposed to each other, where the color filter substrate serves as a counter substrate.

The element substrate that constitutes a part of such a liquid crystal panel is manufactured by laminating various kinds of members on a glass substrate, etc., which serves as a base substance of the element substrate so as to form TFT devices, scanning lines having a predetermined wiring pattern, data lines having a predetermined wiring pattern, external connection terminals, and so on. Next, a transparent conductive film such as ITO is laminated thereon by using a sputtering technique, and thereafter, pixel electrodes are formed in a matrix pattern in the display region by photolithographic method and etching method. Subsequently, an alignment film made of polyimide is deposited on the surface of the substrate on which the pixel electrodes are formed. In this way, an element substrate having various kinds of resin films and conductive films deposited thereon is manufactured.

Next, various members are laminated on a glass substrate, etc., which serves as a base substance for the color filter substrate, which functions as a counter electrode, so as to form a colored layer and a light shielding film. Thereafter, a transparent conductive film such as ITO is laminated thereon by using a sputtering technique, and thereafter, a counter electrode is formed over the entire display region by photolithographic method and etching method. Subsequently, an alignment film made of polyimide is deposited on the surface of the substrate on which the counter electrode is formed. In this way, a color filter substrate having various kinds of resin films and conductive films deposited thereon is manufactured.

Next, the color filter substrate and the element substrate are pasted together by a sealant member to form a cell structure. Then, liquid crystal material is injected inside the cell structure. Thereafter, a polarizing plate, etc., is adhered to the outer surface of the color filter substrate. A polarizing plate, etc., is adhered to the outer surface of the element substrate, too. This is how a liquid crystal panel is manufactured.

Next, the flexible printed circuit board, which is to be connected to the first liquid crystal panel, is prepared. The flexible printed circuit board can be manufactured by forming a wiring pattern made of metallic material such as aluminum, tantalum, and so on, or transparent conductive material such as indium tin oxide (ITO) on the surface of an insulated flexible substrate made of polyimide, etc., which serves as a base substance, and by mounting LEDs as light sources and other electronic components thereon. In addition, in order to ensure a good insulation performance of the formed wiring pattern, an insulating protection film may be affixed to regions except for connection terminals that are to be connected to the light sources and electronic components. The flexible printed circuit board produced in this way is then electrically connected to external connection terminals that are formed on the protrusion portion of the element substrate in the first liquid crystal panel.

2. Assembly

Next, as illustrated in FIG. 13A, the optical waveguide board 15 that has concave portions 150 provided at positions where adhesive members, which stick the flexible printed circuit board and the optical waveguide board together, are provided.

Then, as illustrated in FIG. 13B, each of the adhesive members 151 is pasted such that it overlies both of the concave portion 150 of the optical waveguide board 15 and a part of the chassis 1b to bridge across the border therebetween. Another adhesive member 153 is pasted on a part of another chassis 1a. If the integral-type adhesive member illustrated in FIG. 11c is employed, it is possible to reduce the number of times of adhesions.

Then, as illustrated in FIG. 13C, the first liquid crystal panel 20A is assembled thereto in such a manner that the light sources 13 mounted on the flexible printed circuit board 93 are provided at predetermined positions at the end portion side of the optical waveguide board 15, and under such a positional relationship, the flexible printed circuit board 93 and the optical waveguide board 15 are adhered to each other by the adhesive members 151. At the same time, the flexible printed circuit board 93 is further adhered to the chassis 1a and 1b by the adhesive members 153 and 151, respectively. Although it is not shown in the drawing, the second liquid crystal panel is provided at the opposite side of the first liquid crystal panel with the optical waveguide board interposed therebetween.

In this way, it is possible to efficiently produce a flat liquid crystal device for double-sided display use, featuring a small or, theoretically, no gap between the flexible printed circuit board 93 and the optical waveguide board 15, which makes it further possible to significantly reduce optical leakage to ensure stable brightness.

Third Embodiment

The third embodiment of the invention also discloses a production method of the liquid crystal device explained in the foregoing description on the first embodiment of the invention. In particular, the third embodiment of the invention discloses a method of manufacturing a liquid crystal device, which includes the production steps of: pasting adhesive members having a predetermined shape to a flexible printed circuit board, and adhering the flexible printed circuit board and an optical waveguide board together by the adhesive members in such a manner that the adhesive members are positioned in concave portions of the optical waveguide board formed at a region opposed to the flexible printed circuit board and that light sources are positioned to be opposed to an edge face of the optical waveguide board.

Because the liquid crystal device production method according to the present embodiment of the invention differs from the above-described liquid crystal device production method according to the second embodiment of the invention in its assembly step only, the assembly step is focused in the following explanation whereas other unrelated explanation is omitted.

Figure 14A:
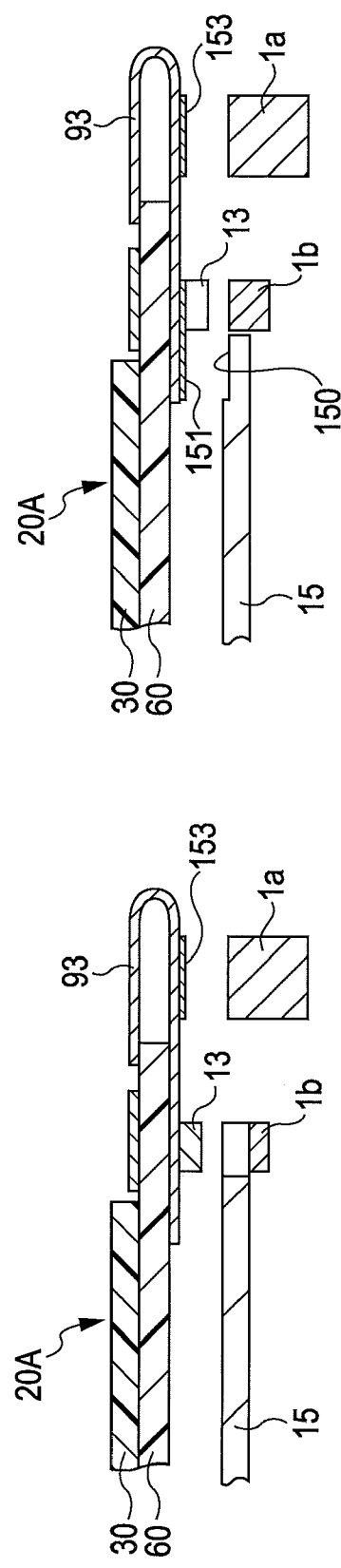
FIGS. 14A and 14B explain a production method of the liquid crystal device according to a third embodiment of the invention.

As illustrated in FIG. 14A, each of the adhesive members 151 is pasted at a position on the flexible printed circuit board 93, which is connected to the first liquid crystal panel 20A, at which the pasted adhesive member 151 fits into the corresponding concave portion 150 provided in the optical waveguide board 15 after fixation thereof. Each of the adhesive members 151 has such a shape that it extends to the region corresponding to the chassis 1b. On the other hand, the adhesive member 153 is pasted at a position thereof corresponding to the fixation position of the chassis 1a. As has already been described, if the integral-type adhesive member illustrated in FIG. 11c is employed, it is possible to reduce the number of times of adhesions.

Figure 14B:

Next, as illustrated in FIG. 14B, the first liquid crystal panel 20 is fitted in such a manner that the flexible printed circuit board 93 and the optical waveguide board 15 are adhered to each other by the adhesive members 151. At the same time, the flexible printed circuit board 93 is further adhered to the chassis 1a and 1b by the adhesive members 153 and 151, respectively. Although it is not shown in the drawing, the second liquid crystal panel is provided at the opposite side of the first liquid crystal panel with the optical waveguide board interposed therebetween.

Likewise the foregoing production method, it is possible, in this alternative production method, to efficiently produce a flat liquid crystal device for double-sided display use, featuring a small or, theoretically, no gap between the flexible printed circuit board 93 and the optical waveguide board 15, which makes it further possible to significantly reduce optical leakage to ensure stable brightness.

Fourth Embodiment

The fourth embodiment of the invention discloses an electronic apparatus that is provided with the liquid crystal device for double-sided display use explained in the first embodiment of the invention.

Figure 15:
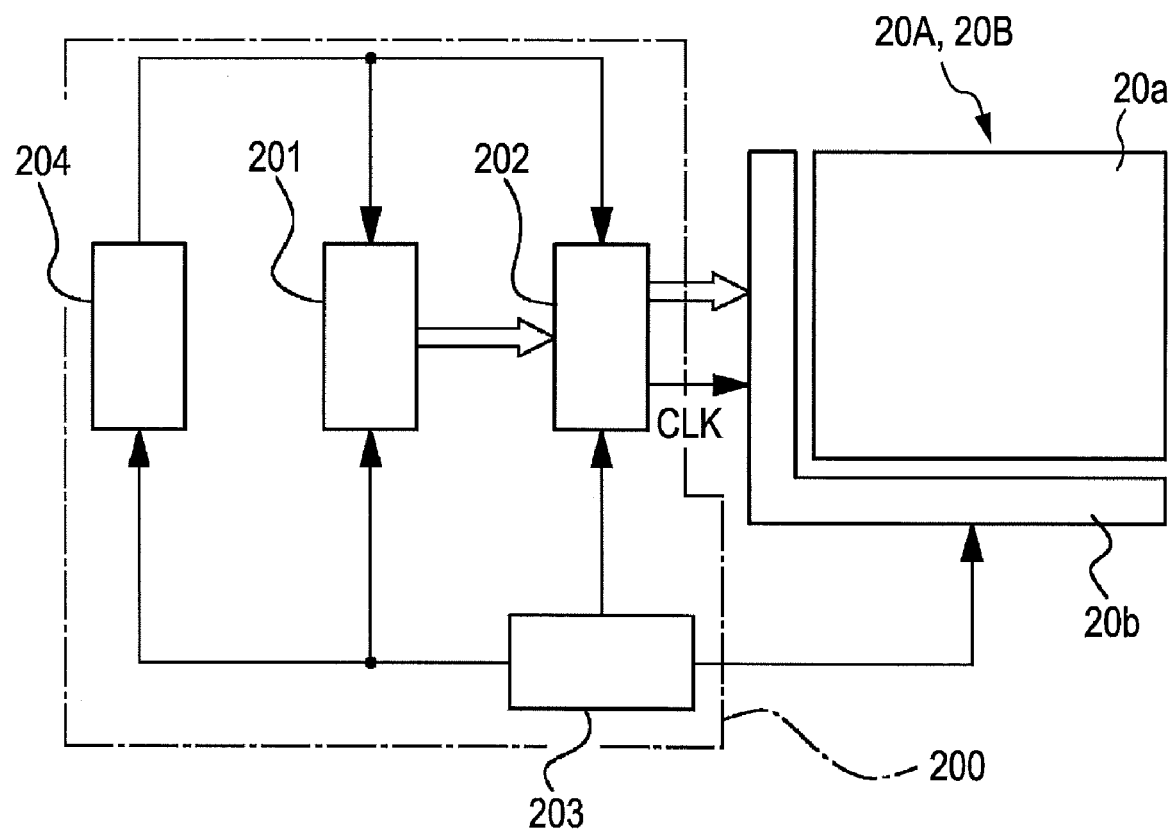
FIG. 15 is a block diagram that illustrates the overall configuration of an electronic apparatus according to a fourth embodiment of the invention.
Figure 16A:
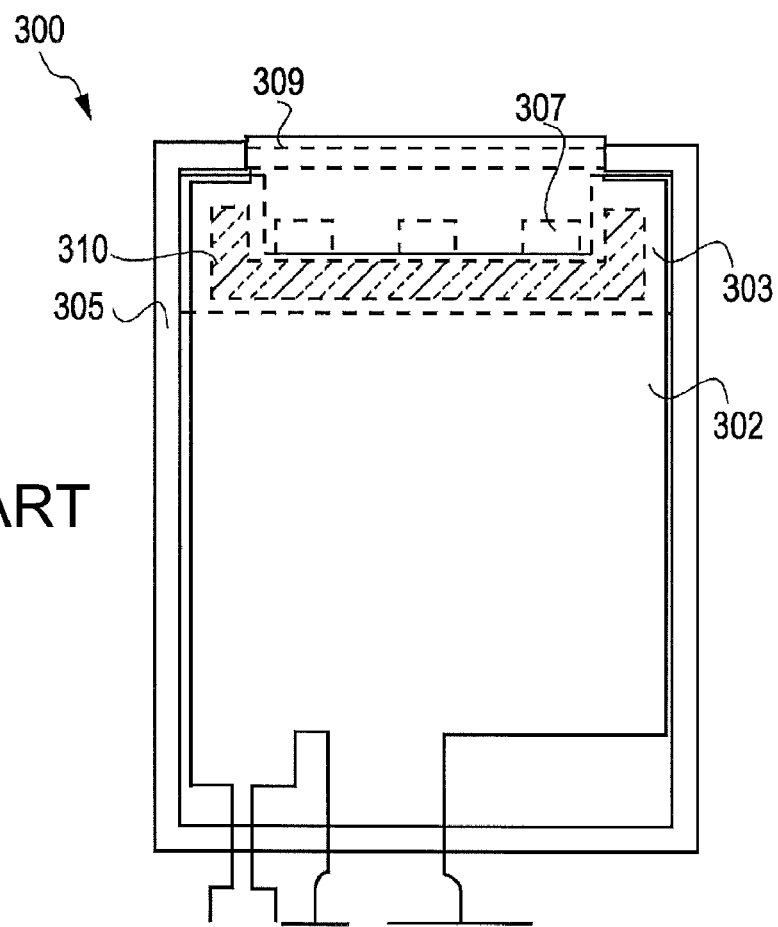
FIGS. 16A, 16B, and 16C are explanatory diagrams that illustrate an exemplary configuration of a conventional electro-optical device.
Figure 16B:
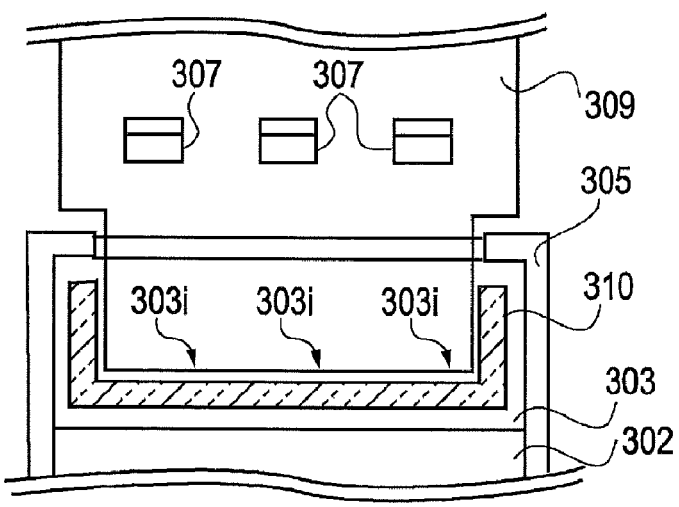
Figure 16C:
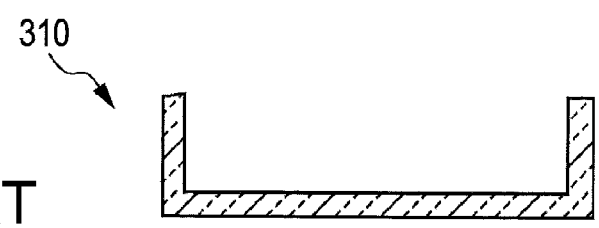
Figure 17:
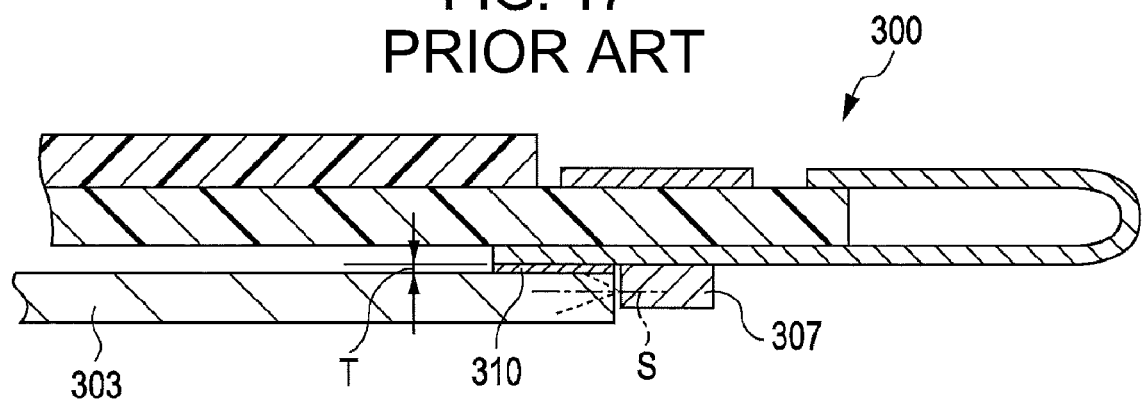
FIG. 17 is an explanatory diagram that illustrates a problem to be solved of the conventional electro-optical device.
Figure 18:
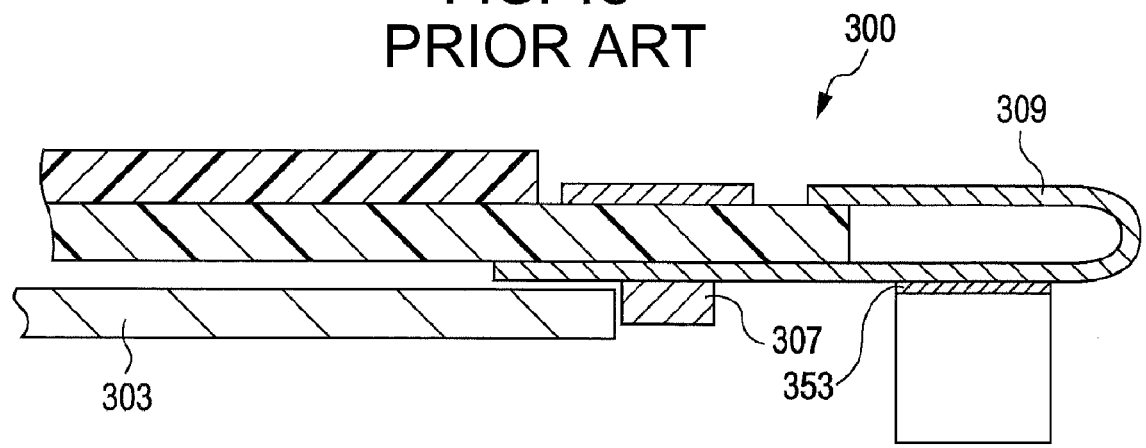
FIG. 18 is an explanatory diagram that illustrates a problem to be solved of another conventional electro-optical device.

FIG. 15 is a schematic configuration diagram that illustrates the overall configuration of an electronic apparatus according to the present embodiment of the invention. The electronic apparatus has the first liquid crystal panel 20A and the second liquid crystal panel 20B provided in the liquid crystal device. The electronic apparatus further includes a control unit 200 that controls the first liquid crystal panel 20A and the second liquid crystal panel 20B. It should be noted that, in FIG. 15, the first liquid crystal panel 20A and the second liquid crystal panel 20B are conceptually divided into a panel structure 20a and a driving circuit 20b. The driving circuit 20b is made up of semiconductor devices (IC) among other components. The control unit 200 is provided with a display information output source 201, a display processing circuit 202, a power supply circuit 203, and a timing generator 204.

The display information output source 201 has a memory that is constituted by Read Only Memory (ROM), Random Access Memory (RAM), etc., a storage unit that is constituted by a magnetic recording disk, an optical recording disk, etc., and a tuning circuit that provides a "tuned-output" of a digital image signal. The display information output source 201 is configured to supply display information to the display processing circuit 202 in the form of image signals having a predetermined format based on various clock signals generated by the timing generator 204.

The display processing circuit 202 is provided with various kinds of well-known circuits including but not limited to a serial-parallel conversion circuit, an amplifier/inverter circuit, a rotation circuit, a gamma correction circuit, and a clamping circuit. The display processing circuit 202 performs the processing of the inputted display information to supply image information thereof together with a clock signal CLK to the driving circuit 20b. The driving circuit 20b may include a first electrode driving circuit, a second electrode driving circuit, and a test circuit. The power supply circuit 203 functions to supply a predetermined voltage to each of the constituent elements of the electronic apparatus described above.

In the electronic apparatus according to the present embodiment of the invention, a flexible printed circuit board is adhered to concave portions of an optical waveguide board by adhesive members, where the concave portions are provided at positions corresponding to those of the adhesive members. With such a configuration, it is possible to realize an electronic apparatus which features a small or, theoretically, no gap between the flexible printed circuit board and the optical waveguide board at regions thereof where the adhesive members are not pasted, which makes it further possible to significantly reduce optical leakage to ensure stable brightness.

The present invention has now made it possible to provide an electro-optical device and an illumination device that are capable of effectively preventing optical leakage and obtaining stable brightness while fixing the optical waveguide board and the flexible printed circuit board together, which is achieved by firstly, fixing the optical waveguide board and the flexible printed circuit board to each other by adhesive members and by, secondly, forming concave portions in the optical waveguide board in such a manner that each of the concave portions is provided at a position where a corresponding one of the adhesive members is placed.

Therefore, the invention is applicable to an electro-optical apparatus such as a liquid crystal apparatus having TFD devices or TFT devices, and an electronic apparatus that is provided with such an electro-optical apparatus. More particularly, for example, the invention can be embodied in a wide variety of applications, including an electronic apparatus having, without any limitation thereto, a mobile phone, a personal computer, a liquid crystal television, a viewfinder-type video recorder or a direct-monitor-view-type video recorder, a car navigation device, a pager, an electrophoresis device, an electronic personal organizer, an electronic calculator, a word processor, a workstation, a videophone, a POS terminal, or a touch-panel device.

What is claimed is:

1. An electro-optical device comprising:
an electro-optical panel;
a light source that emits light that enters the electro-optical panel;
an optical waveguide board that guides the light emitted from the light source toward the electro-optical panel;
a flexible printed circuit board on which the light source is mounted and
a chassis that houses the electro-optical panel and the optical waveguide board,
wherein the flexible printed circuit board is overlapped to the optical waveguide board and a part of the chassis, the flexible printed circuit board being adhered to the optical waveguide board by an adhesive member and being adhered to the chassis by the same adhesive member in such a manner that the light source is positioned to be opposed to an edge face of the optical waveguide board, and
a concave portion is formed in the optical waveguide board at least at a position where the adhesive member is provided.

2. The electro-optical device according to claim 1, wherein a depth of the concave portion is equal to a thickness of the adhesive member.

3. The electro-optical device according to claim 1, wherein the concave portion is interposed between an adjacent pair of light sources.

4. The electro-optical device according to claim 1, wherein the optical waveguide board has a protruding portion that is interposed between an adjacent pair of light sources, and the concave portion is formed in the protruding portion.

5. The electro-optical device according to claim 1, wherein the opposite side of the concave portion of the optical waveguide board has a slope portion that thickens towards the light source.

6. The electro-optical device according to claim 1, wherein the opposite side of the concave portion of the optical waveguide board is supported by a protrusion portion of the chassis.

7. An electronic apparatus having the electro-optical device according to claim 1.

8. An illumination device comprising:

a light source that emits light;

an optical waveguide board that guides the light emitted from the light source toward a light-emitting surface of the optical waveguide board;

a flexible printed circuit board on which the light source is mounted; and a chassis that houses the optical waveguide board, wherein the flexible printed circuit board is overlapped to the optical waveguide board and a part of the chassis, the flexible printed circuit board being adhered to a the optical waveguide board by an adhesive member and being adhered to the chassis by the same adhesive member in such a manner that the light source is positioned to be opposed to an edge face of the optical waveguide board, and a concave portion is formed in the optical waveguide board corresponding to a position where the adhesive member is provided.

* * * * *